Feb. 18, 1958 R. B. STANLEY 2,823,493
WHEEL TRUING MACHINE
Filed July 9, 1956 22 Sheets-Sheet 1

INVENTOR.
Richard B. Stanley,
BY
Sabin C. Bronson
Atty.

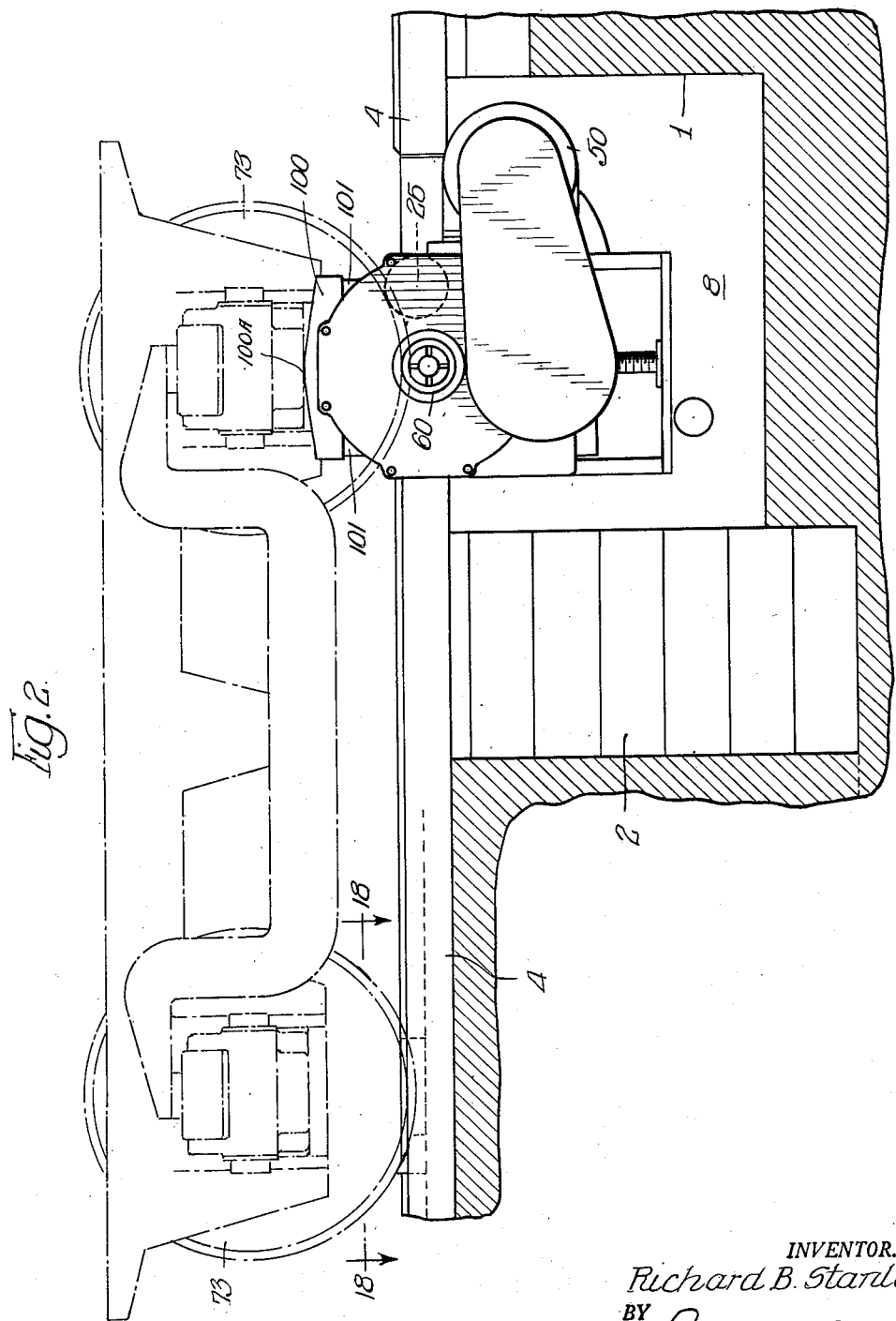

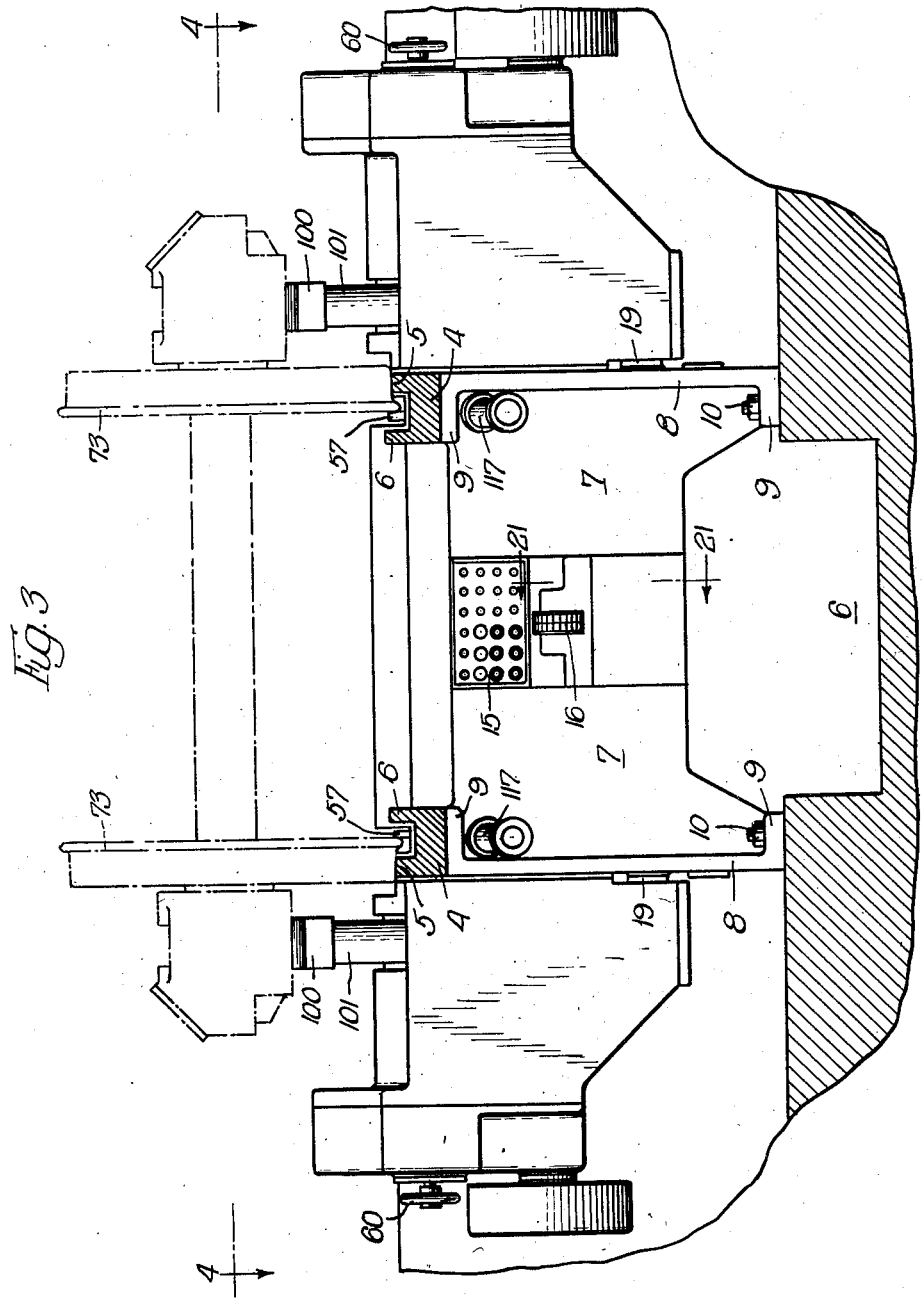

Feb. 18, 1958 R. B. STANLEY 2,823,493
WHEEL TRUING MACHINE
Filed July 9, 1956 22 Sheets-Sheet 4
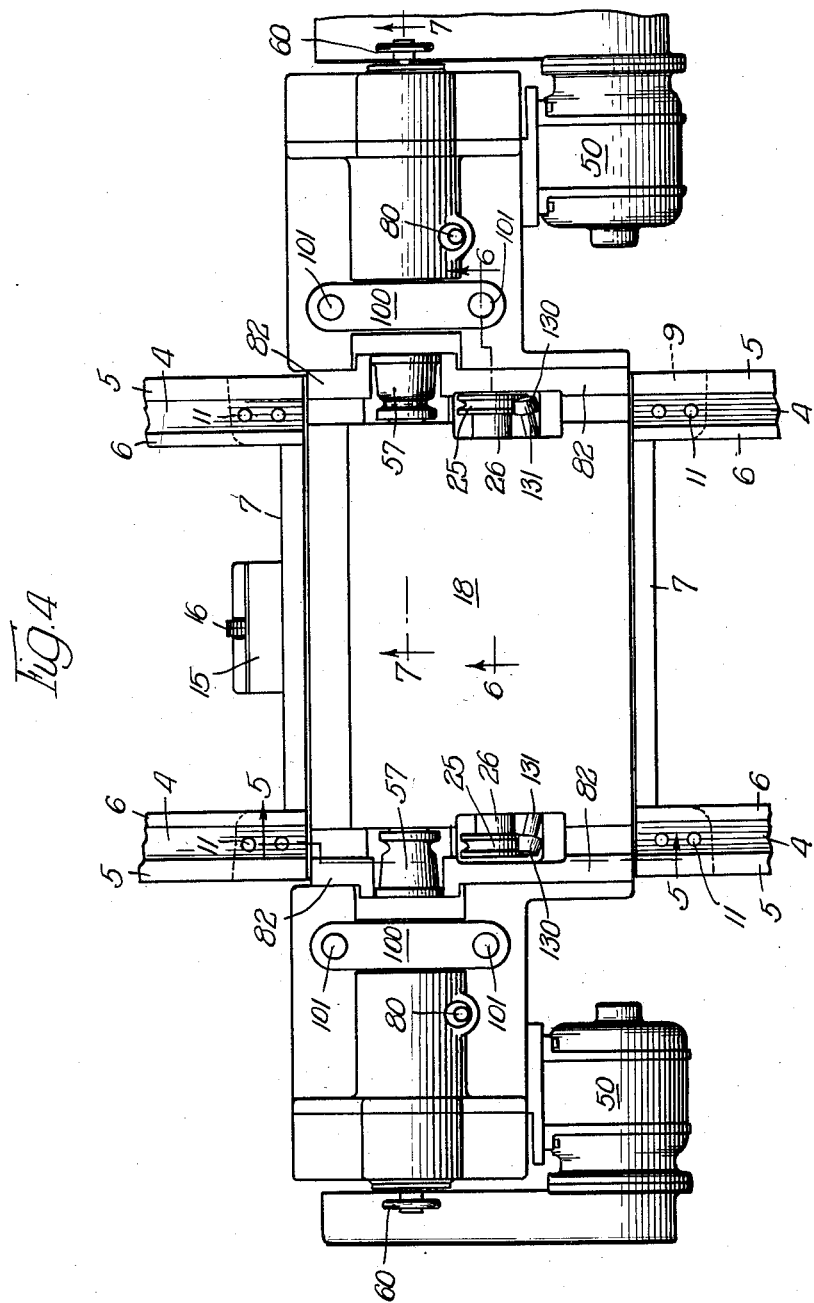
INVENTOR.
Richard B. Stanley,
BY
Sabin C. Bronson
atty

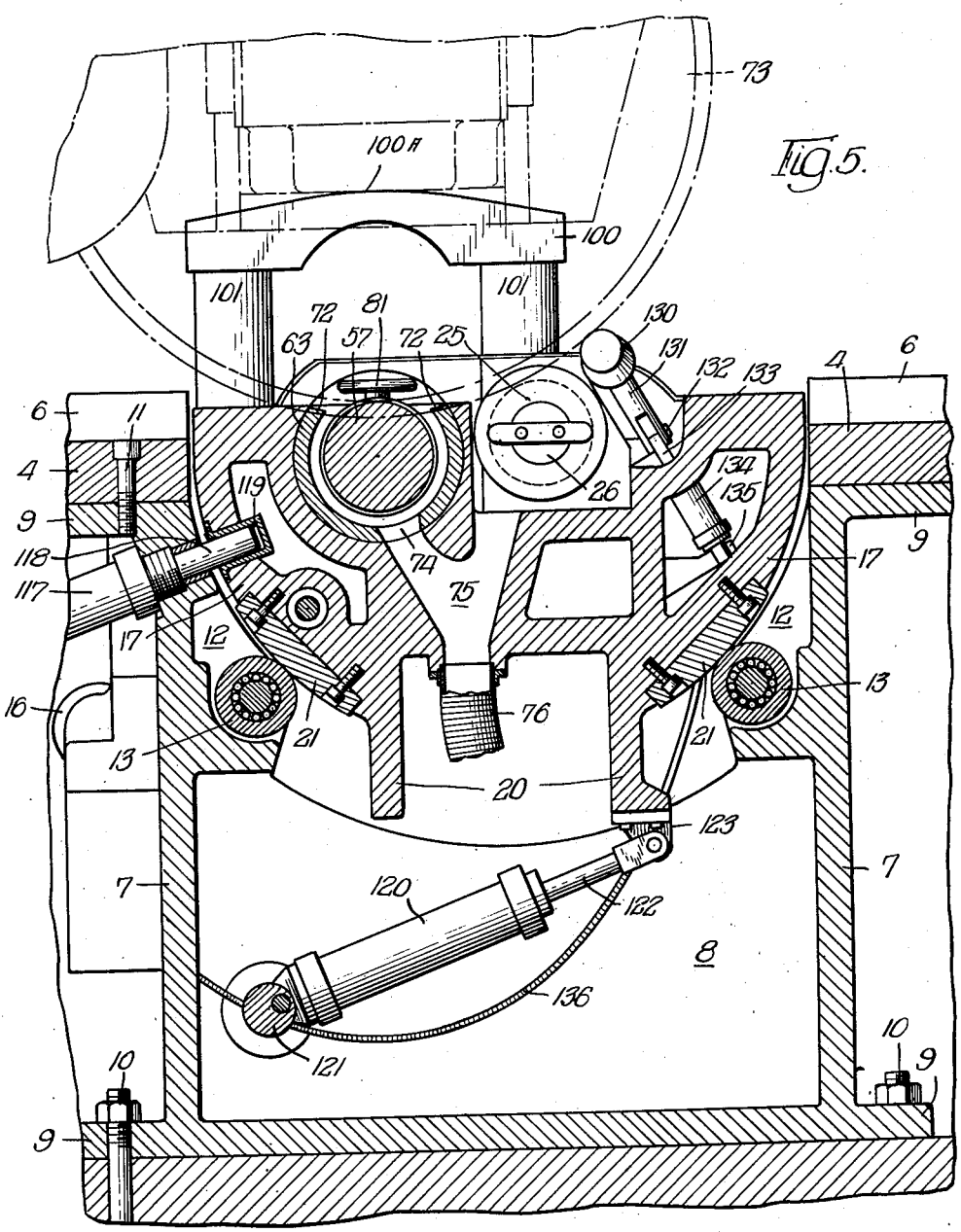

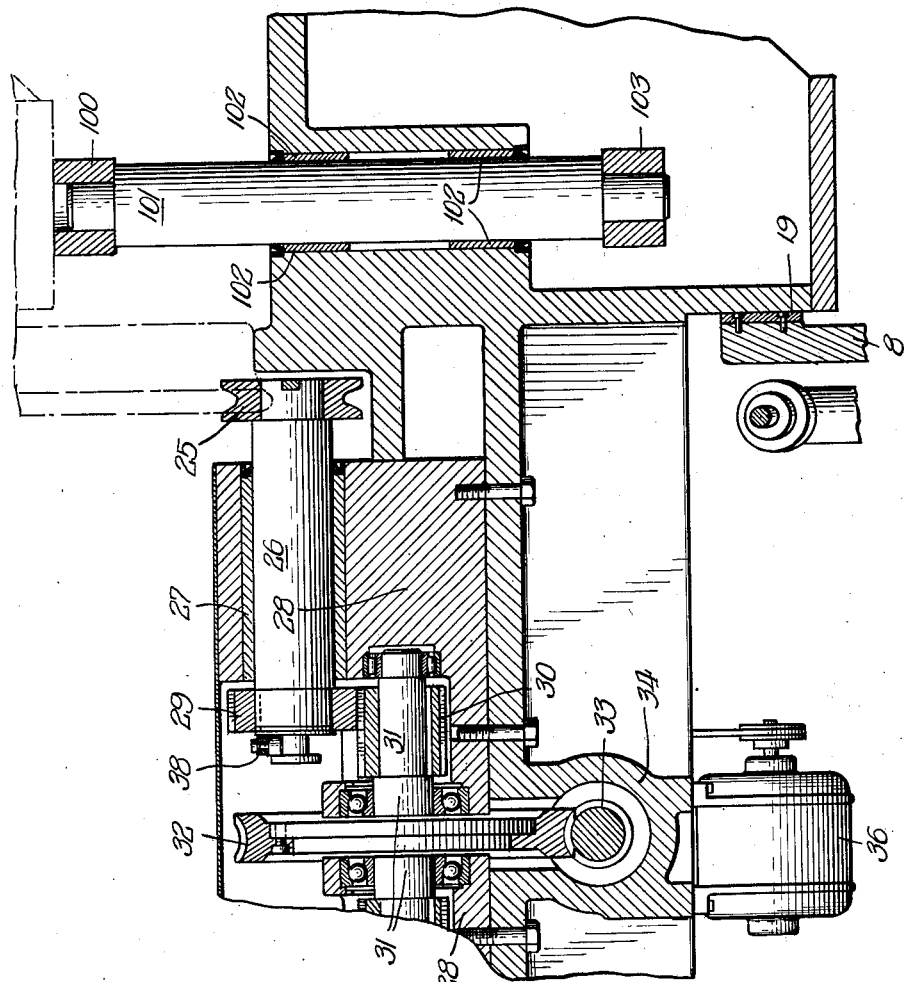

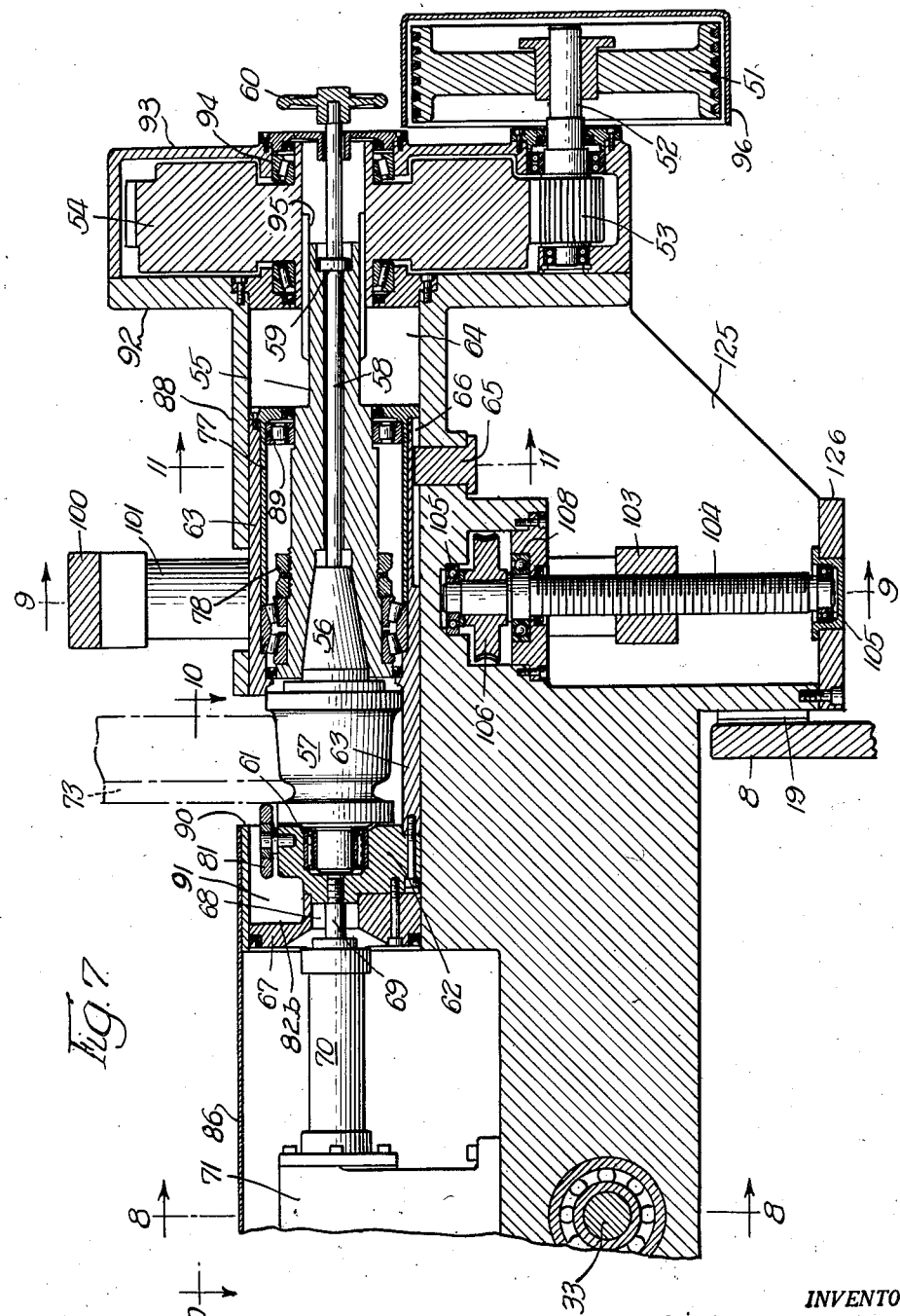

Feb. 18, 1958 R. B. STANLEY 2,823,493
WHEEL TRUING MACHINE
Filed July 9, 1956 22 Sheets-Sheet 8
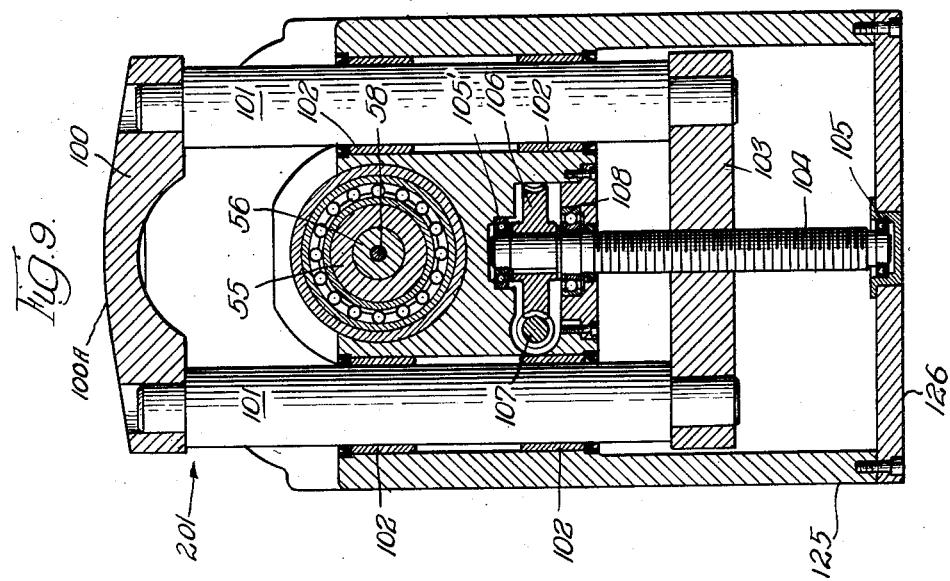
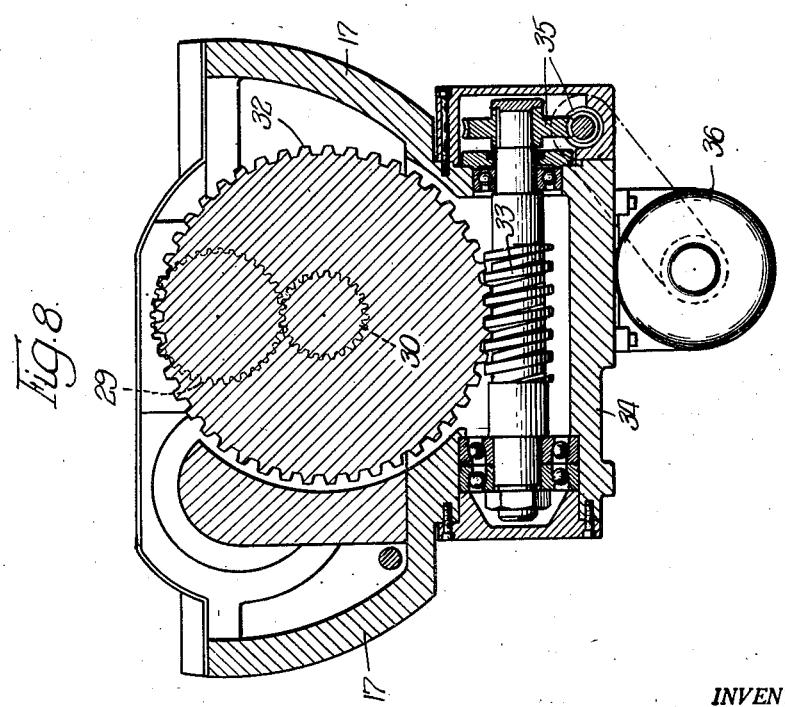
INVENTOR.
Richard B. Stanley,
BY
Sabin C. Bronson
ATTY

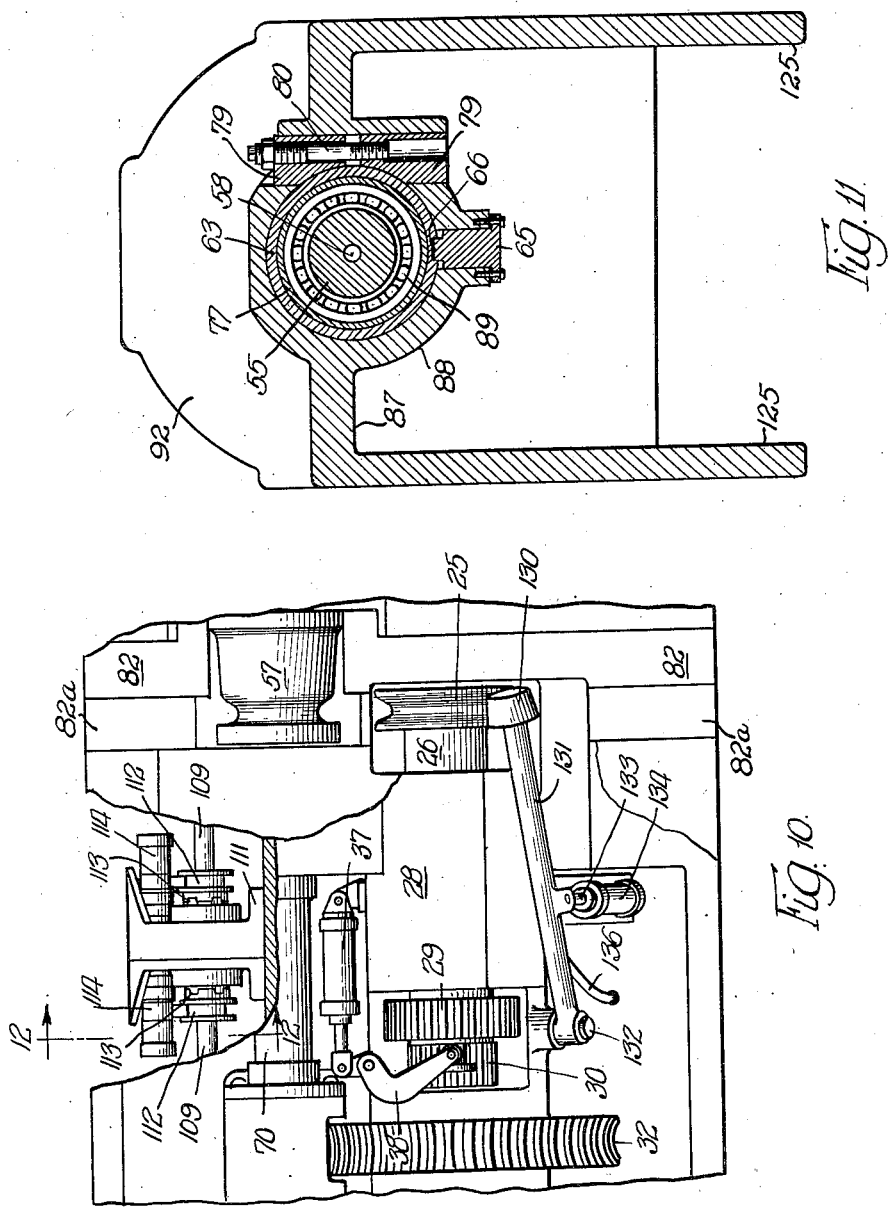

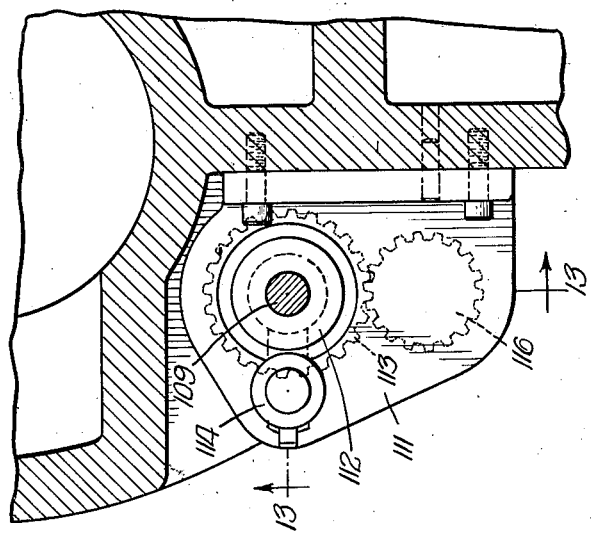
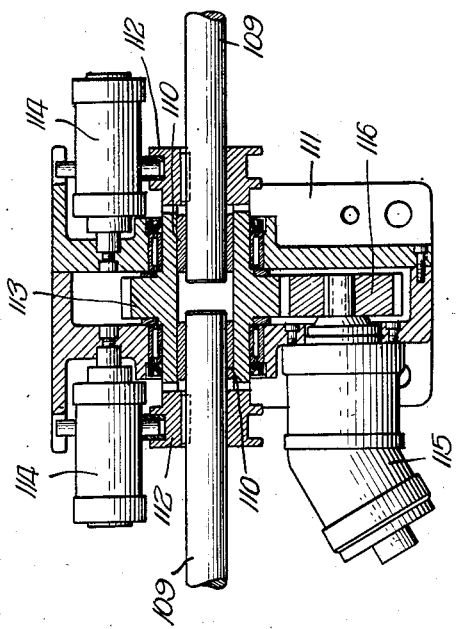

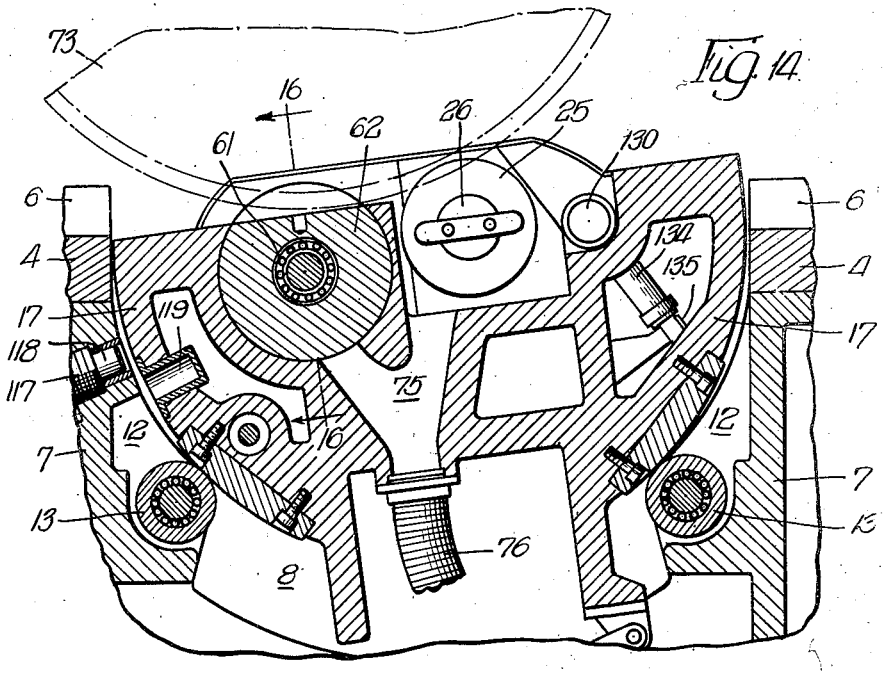
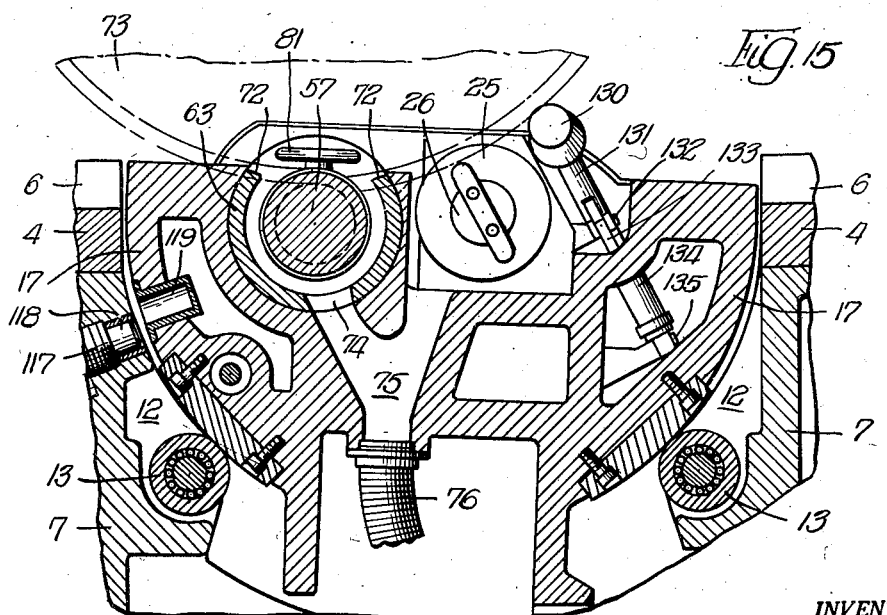

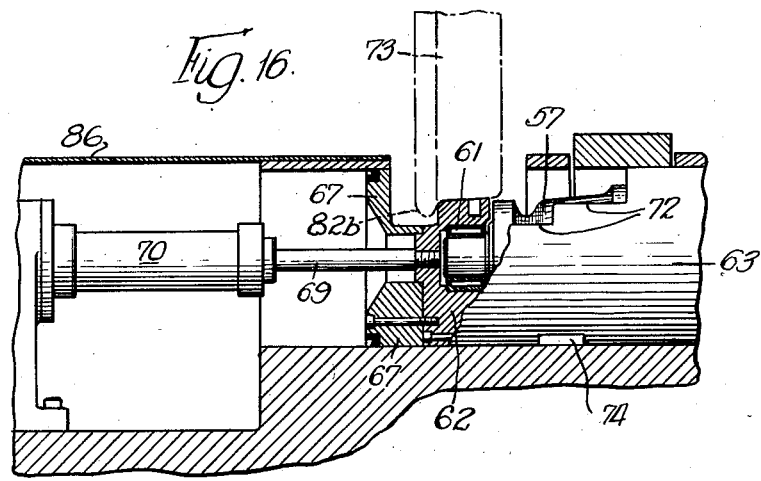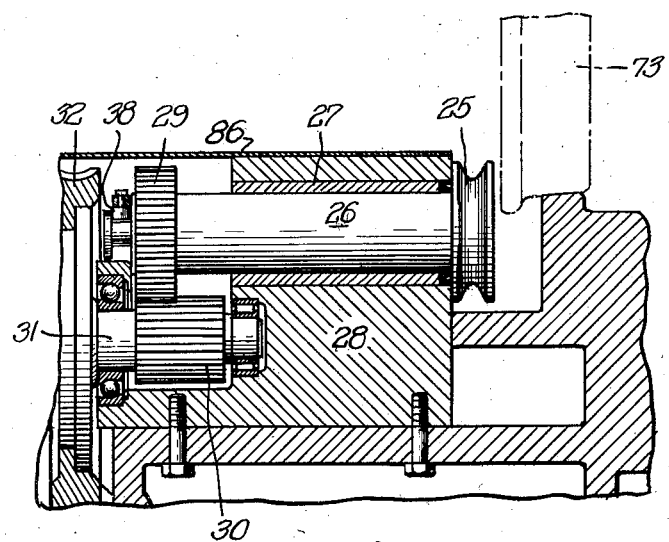

Feb. 18, 1958 R. B. STANLEY 2,823,493
WHEEL TRUING MACHINE
Filed July 9, 1956 22 Sheets-Sheet 13
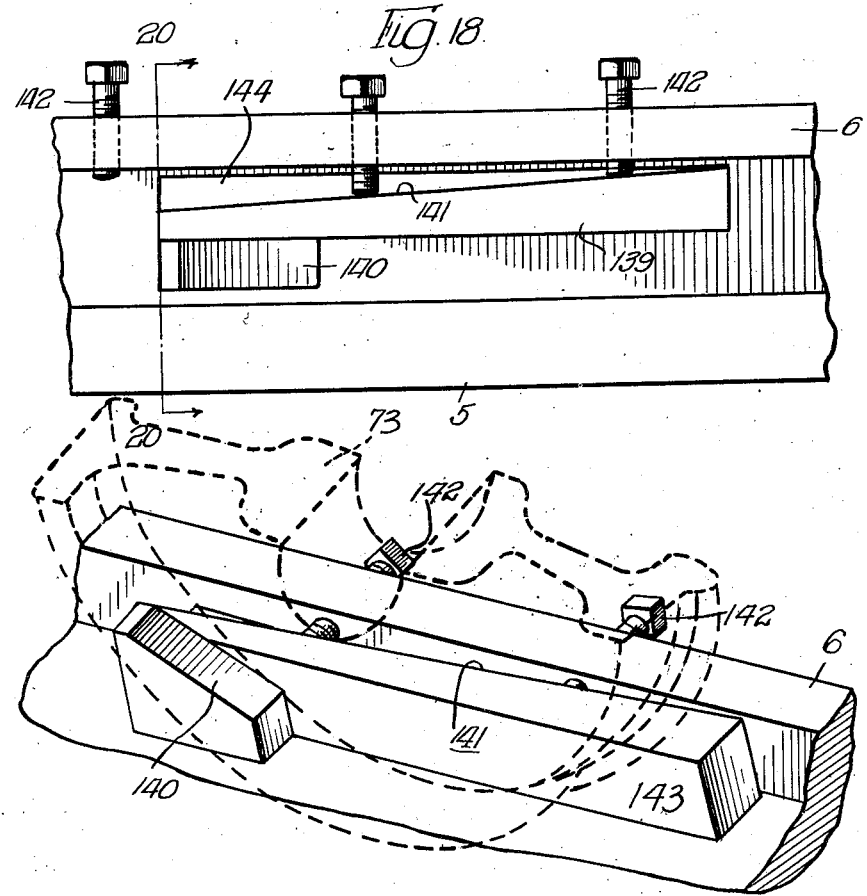
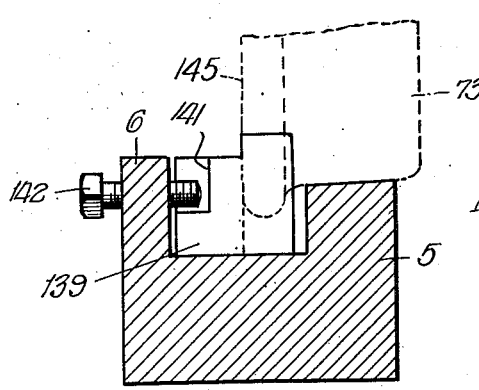
INVENTOR.
Richard B. Stanley,
BY

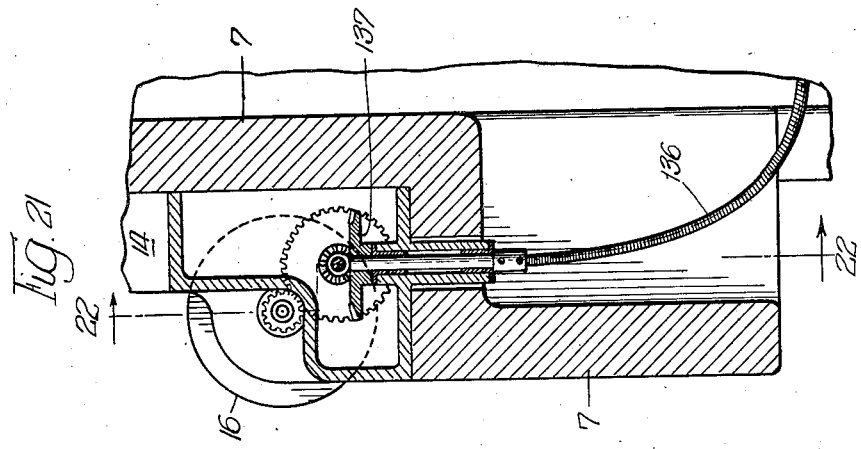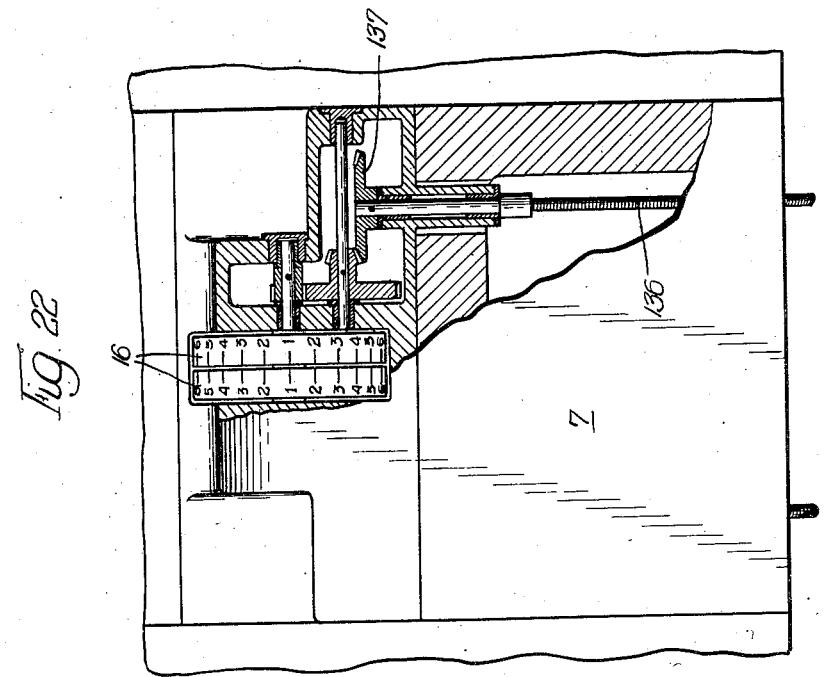

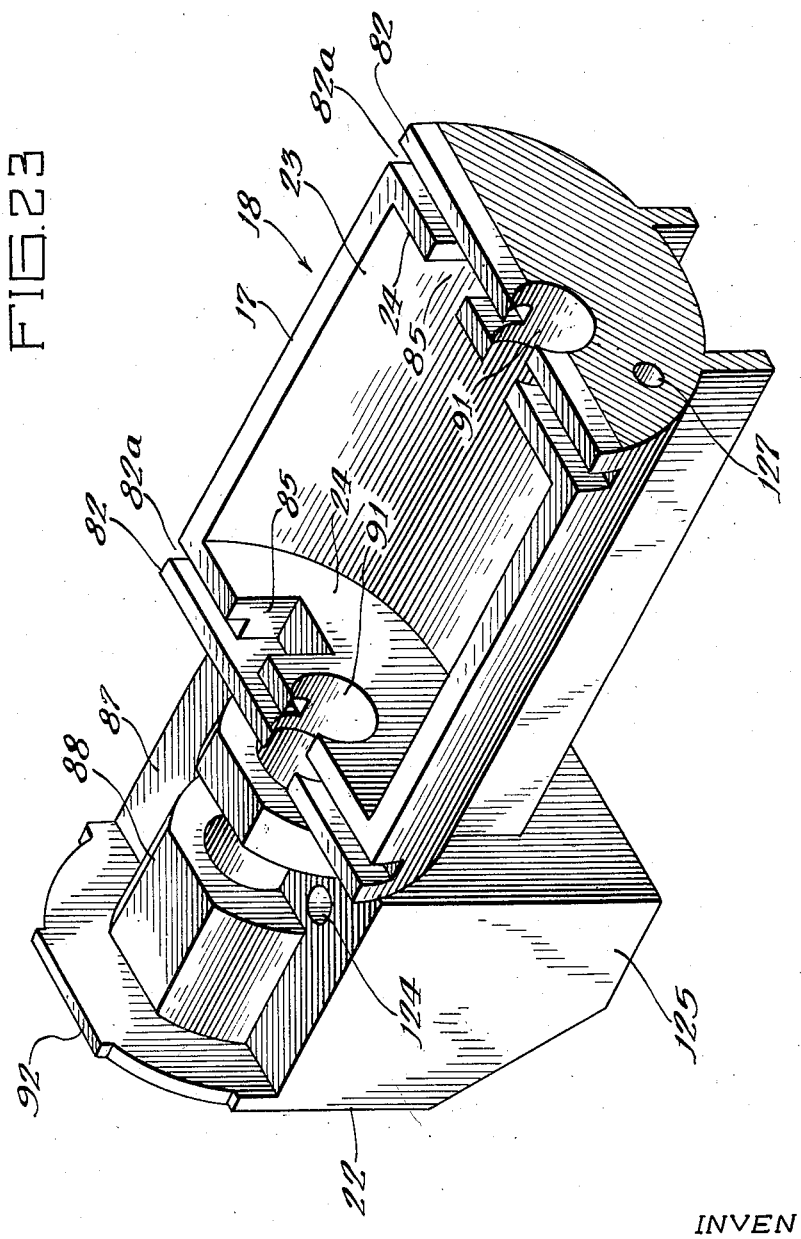

Feb. 18, 1958   R. B. STANLEY   2,823,493
WHEEL TRUING MACHINE
Filed July 9, 1956   22 Sheets-Sheet 16
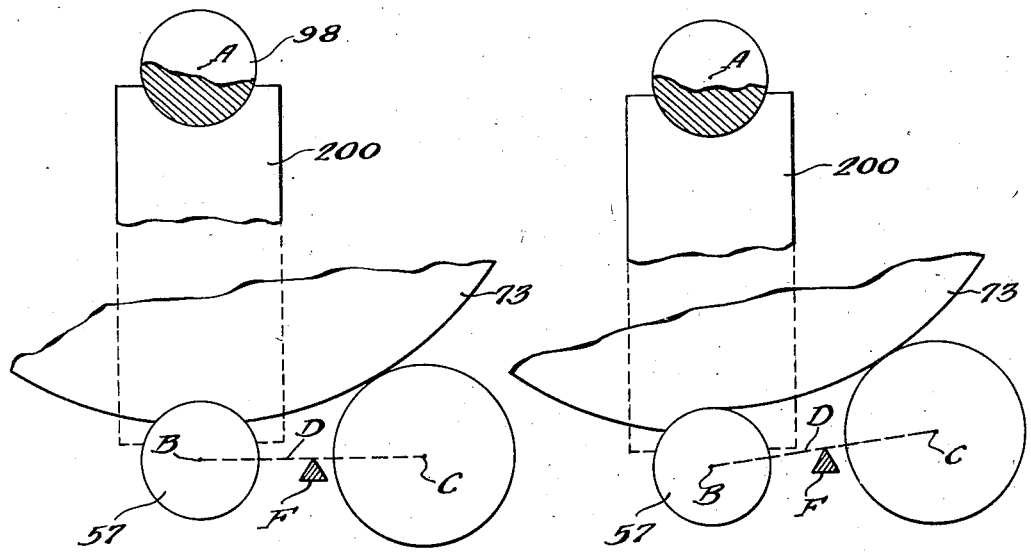
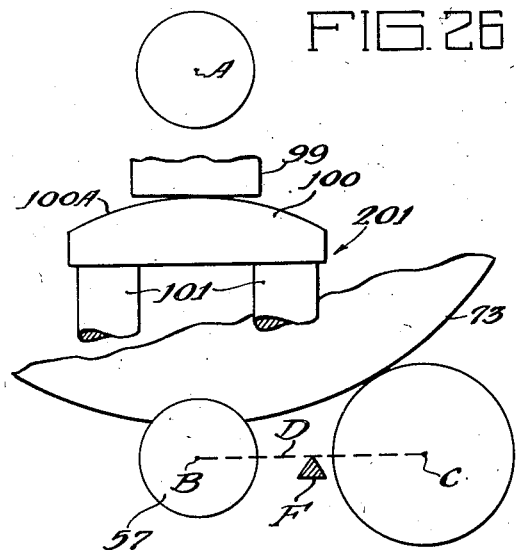
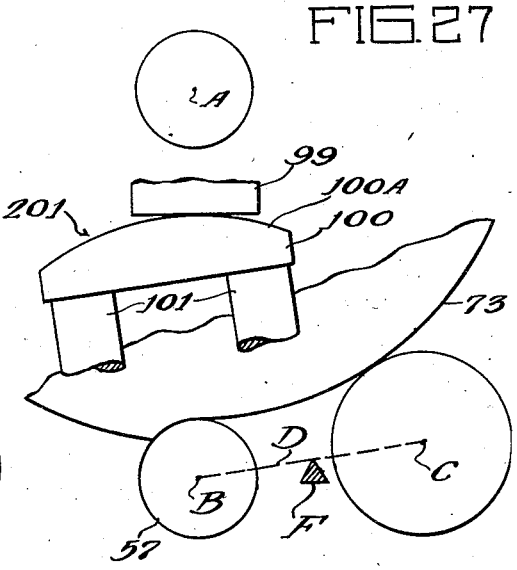
INVENTOR.
Richard B. Stanley
BY
ATTORNEYS

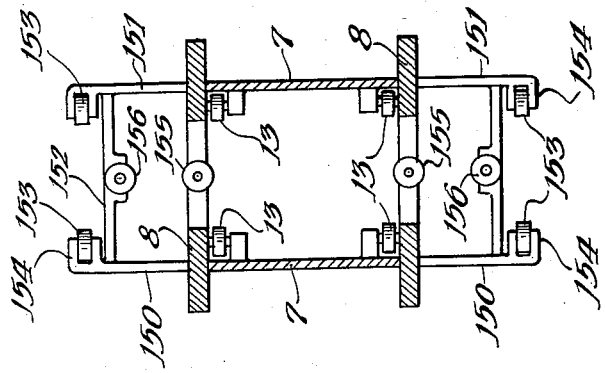
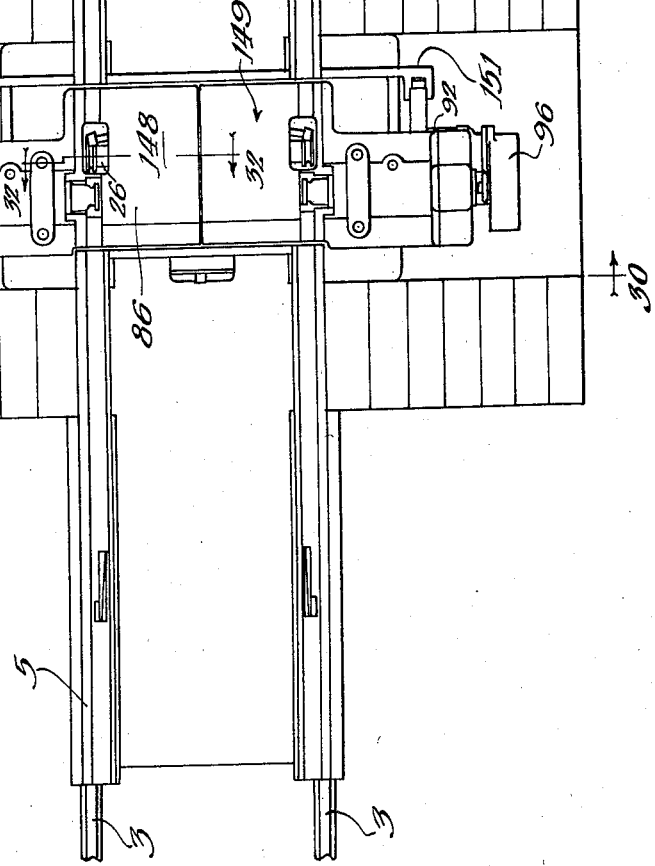

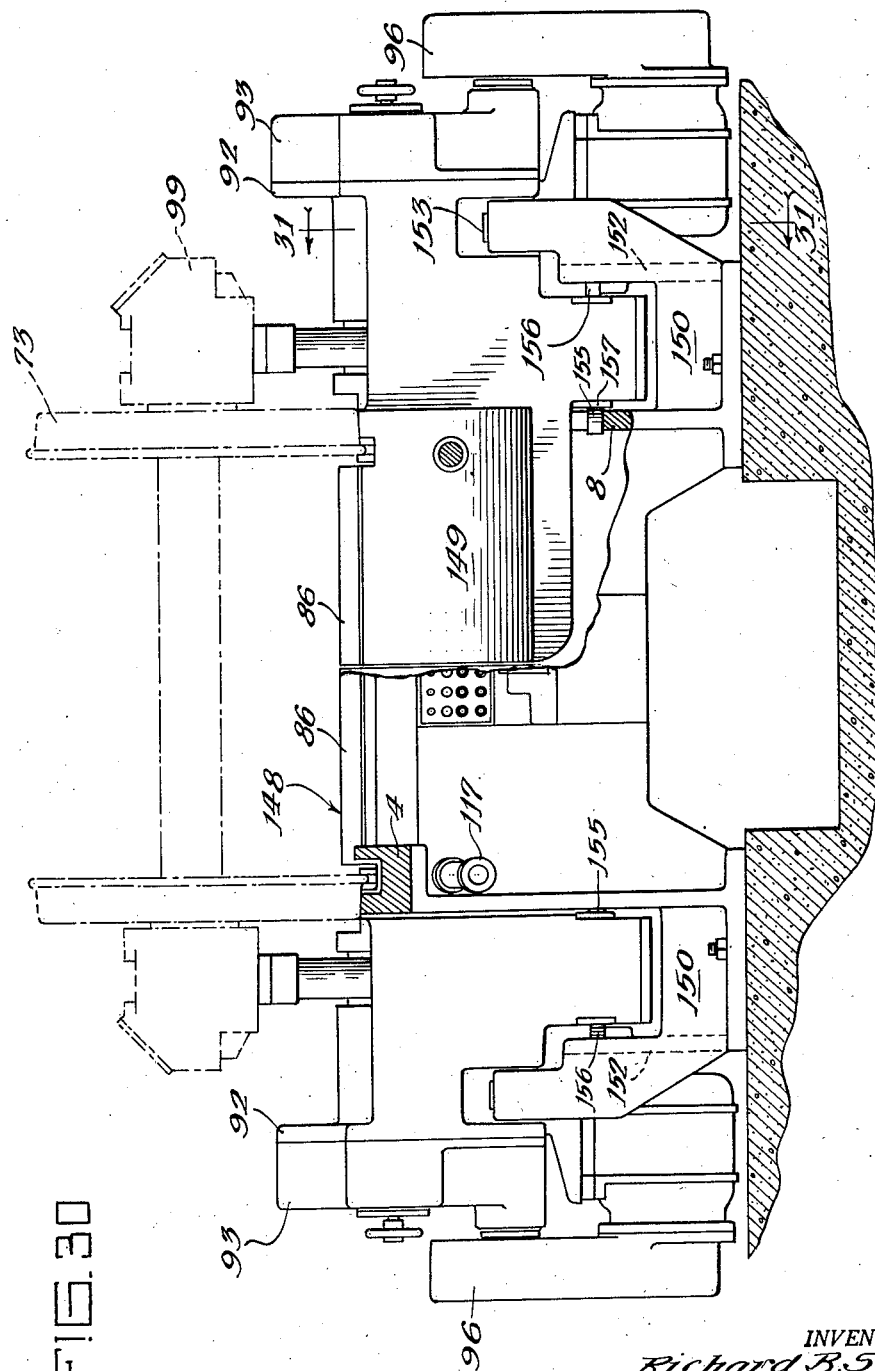

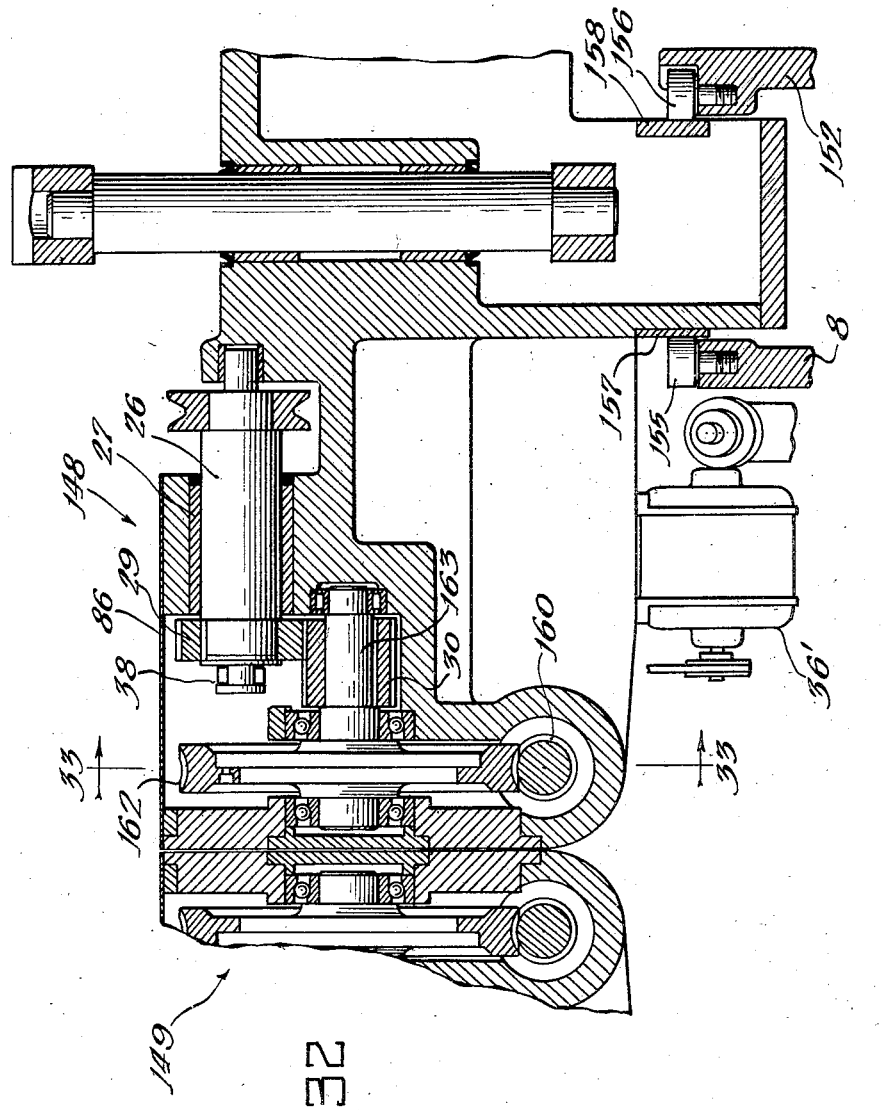

Feb. 18, 1958  R. B. STANLEY  2,823,493
WHEEL TRUING MACHINE
Filed July 9, 1956  22 Sheets-Sheet 21
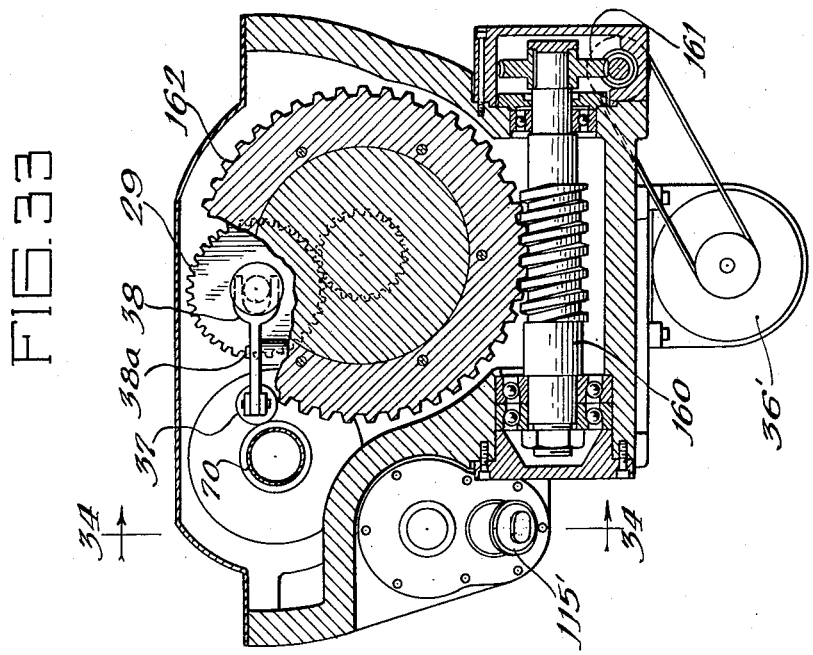
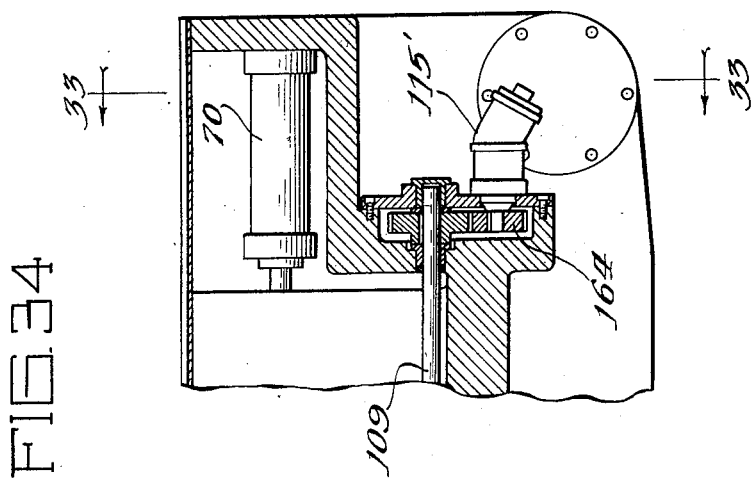
INVENTOR.
Richard B. Stanley
BY Zabel, Baker, York,
Jones & Dithmar
ATTORNEYS Feb. 18, 1958 R. B. STANLEY 2,823,493
WHEEL TRUING MACHINE
Filed July 9, 1956 22 Sheets-Sheet 22

INVENTOR.
Richard B. Stanley
By Zabel, Baker, Yoh,
Jones & Dithmar
ATTORNEYS

United States Patent Office 2,823,493
Patented Feb. 18, 1958

2,823,493

WHEEL TRUING MACHINE

Richard B. Stanley, Park Ridge, Ill., assignor, by mesne assignments, to Standard Railway Equipment Manufacturing Company, Chicago, Ill., a corporation of Delaware Application July 9, 1956, Serial No. 596,764

32 Claims. (Cl. 51—104)

This invention relates to improvements in machines for truing or refinishing the wheels of railroad rolling stock, or the like, without removing them from the car or locomotive.

The present application is a continuation-in-part of copending application, Serial No. 291,159, filed June 2, 1952 now abandoned.

Car wheels are subject to wear during normal use. The wear may be with respect to the profile of the tread and flange, or it may be with respect to concentricity. Flat spots due to skidding are an example of the latter. When a wheel or wheels of a car develop such flat spots or other wear beyond condemning limits, those wheels must be trued before the car can again be placed in regular service.

The present invention is an improvement over the wheel truing machine of my prior Patent No. 2,622,374 dated December 23, 1952.

A wheel truing machine of the type shown in the aforesaid prior patent includes a finishing tool, a drive wheel, and tool locating means. The finishing tool may be a milling cutter, a grinding wheel or a lathe tool type of cutter. The drive wheel engages the car wheel and drives it, and may support some or all of the weight or load on the car wheel. The tool locating means serves to locate the finishing tool with respect to the wheel center to provide a true cut, that is, a true surface of revolution. The tool locating means is preferably adjustable so that the depth of cut may be adjusted, this adjusting means being referred to as an elevator mechanism.

According to my prior patent, separate supporting means are provided for both the drive wheel and the finishing tool, and such an arrangement requires an additional elevator mechanism for the finishing tool.

According to the present invention, a common support is provided for both the drive wheel and the finishing tool, and this support, referred to herein as a rock beam, is mounted for rotation about a transverse axis. This rock beam is designed for free rotation, during the truing operation, under the equilibrium of the forces exerted thereon, thus providing automatic adjustment of the relative positions of the drive wheel and the tool mechanism, with the result that the additional elevator mechanism of my prior patent can be eliminated.

It can further be pointed out that during the course of the wheel truing operation, the distance between the drive wheels and the axis of the wheels to be trued will undergo some variation. The rock beam construction herein disclosed will accommodate this variation in distance with the result that the drive wheel is at all times in driving engagement with the periphery of the wheel to be trued.

It is an object of the present invention to provide an improved wheel truing machine which eliminates one of the elevating mechanisms heretofore used in the prior art.

It is another object of the present invention to provide a wheel truing machine which embodies a rock beam type of construction which provides a common support for both the drive wheel and the finishing tool, thus providing a machine of greater simplicity and of less cost.

A further object is to provide, in a wheel truing machine of the class described, an improved tool locating means which embodies elevating mechanism by means of which the distance between the car wheel axis and the finishing tool axis may be regulated to a fine degree.

A still further object is to provide tool locating means of the type indicated which engages the journal box of the wheel to be trued rather than the tail stock type of tool locating means of the prior art to the end that a heavier load can be sustained by the tool locating means.

Still another object is to provide a wheel truing machine such that the tool locating means can be utilized as a truck elevating means to facilitate set up of the machine.

Another object of the present invention is to provide a wheel truing machine which does not require the use of slidable or movable rail sections of the type indicated in the aforesaid prior Patent No. 2,622,374, and also described in greater detail in Stanley Patent No. 2,622,378 dated December 23, 1952. In this connection, the rock beam of the present invention in itself provides the track section which fills the gap in the track in which the wheel truing machine is located.

Still another object is to provide in a wheel truing machine which provides its own track section, means for retracting the finishing tool and the drive wheel in a transverse direction to the end that a continuous track section may be provided which is unimpeded by the aforesaid machine elements.

A still further object is to provide an improved wheel truing machine embodying a novel principle of operation such that the mechanism automatically adjusts itself to variation in the radius of the untrued surface of the wheel to be trued without in any way affecting the concentricity of the surface of revolution which is generated.

With reference now to the drawings in which like reference numerals designate like parts:

Fig. 2 is a side elevation of the wheel truing machine shown in Fig. 1, and section through the pit on the line 2—2 of Fig. 1, showing in dotted lines a wheeled vehicle truck with one pair of wheels in position over the machine;

Fig. 3 is a vertical transverse section on the line 3—3 of Fig. 1 showing in dotted lines a wheeled axle in position over the machine;

Fig. 4 is a plan section on line 4—4 of Fig. 3, illustrating a top plan view of the machine;

Fig. 5 is a vertical longitudinal section on the line 5—5 of Fig. 4;

Fig. 6 is a vertical transverse section on line 6—6 of Fig. 4;

Fig. 7 is a vertical transverse section on line 7—7 of Fig. 4;

Fig. 8 is a vertical longitudinal section on the line 8—8 of Fig. 7;

Fig. 9 is a vertical longitudinal section on the line 9—9 of Fig. 7, partly in elevation;

Fig. 10 is a plan section on the line 10—10 of Fig. 7 with the cover plate broken away;

Fig. 11 is a vertical longitudinal section on line 11—11 of Fig. 7;

Fig. 12 is a vertical longitudinal section on line 12—12 of Fig. 10;

Fig. 13 is a section on the line 13—13 of Fig. 12;

Figs. 14 and 15 are vertical longitudinal sections similar to Fig. 5 showing the rock beam in different relative positions;

Fig. 16 is a vertical transverse section on the line 16—16 of Fig. 14;

Fig. 17 is a section similar to Fig. 6 but showing the wheel in its retracted position;

Fig. 18 is a section on the line 18—18 of Fig. 2 showing a plan view of the wheel lock;

Fig. 19 is an isometric view of Fig. 18;

Fig. 20 is a section on the line 20—20 of Fig. 18, showing, in dotted lines, a portion of the wheel thereon;

Fig. 21 is a vertical longitudinal section on the line 21—21 of Fig. 3;

Fig. 22 is a vertical transverse section on the line 22—22 of Fig. 21;

Fig. 23 is an isometric view showing a general shape of the casting which comprises the rock beam;

Figs. 24–27 are diagrams illustrating the operation of the rock beam;

Fig. 28 is a plan view of a modified form of my invention showing the relationship of the two rock beams to each other;

Fig. 29 is a plan view of the supporting framework for the rock beams of Fig. 28;

Fig. 30 is a transverse vertical section, similar to Fig. 3, but partially broken away, and showing the modification of Figs. 28 and 29;

Fig. 32 is a transverse vertical section taken along line 32—32 of Fig. 28, and showing the separate rotating means for each of the drive wheels 25;

Fig. 33 is a vertical longitudinal section taken along line 33—33 of Fig. 32;

Fig. 34 is a vertical transverse section taken along line 34—34 of Fig. 33 showing the separate driving means for each of the elevator shafts;

*General organization*

The structure of the machine, as shown in Figs. 1–4, includes generally a supporting frame 7—8 located in a pit 1, and a rock beam 18 supported by the frame.

Figure 1:
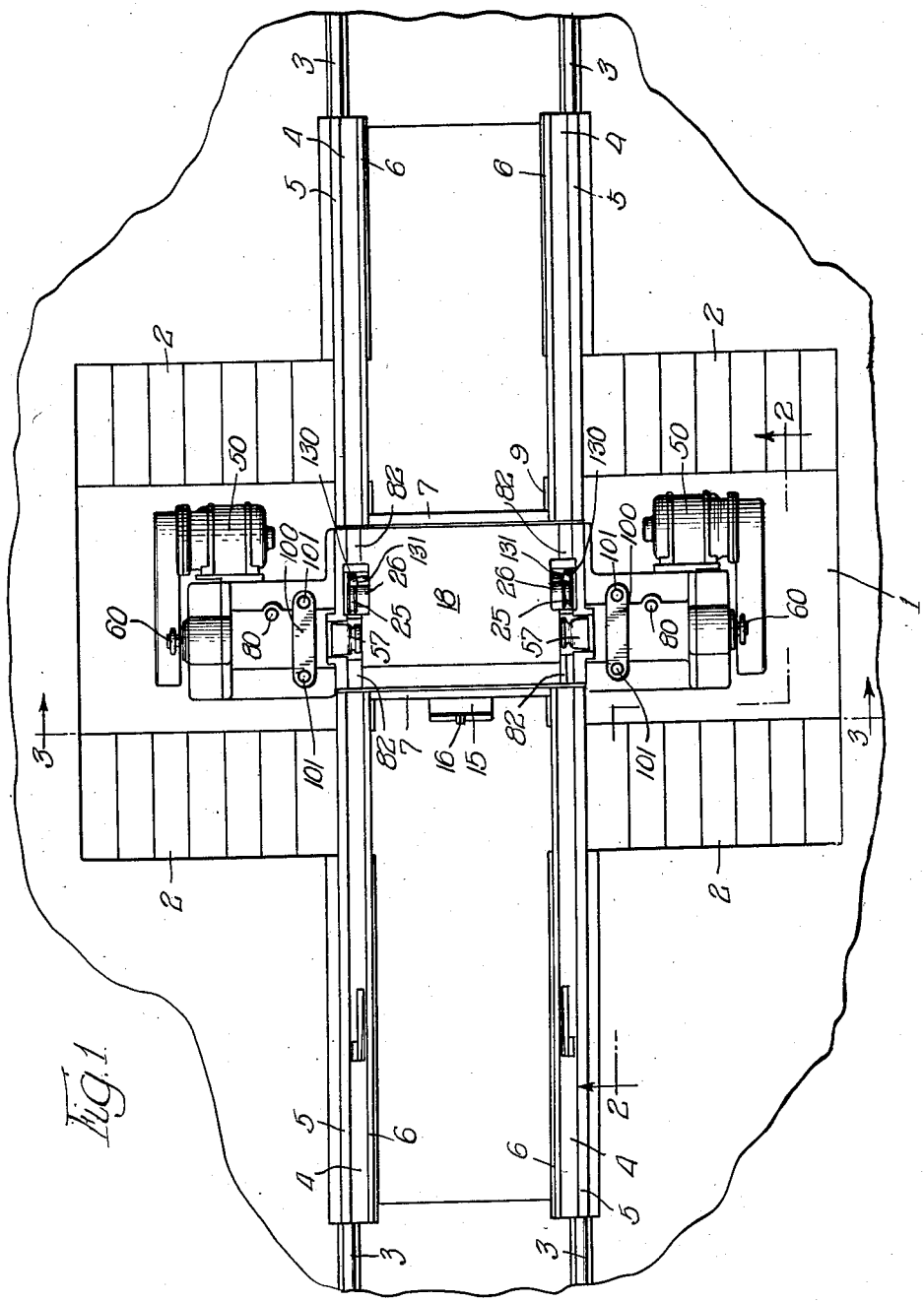
Fig. 1 is a plan view of a pit associated with a section of a railroad track and having my improved wheel truing machine installed therein.

This pit is formed below the ground level, and four sets of stairways, shown at 2, provide access from the ground level to the bottom of the pit. As indicated in Fig. 1, a pair of railroad tracks 3 extend away from opposite sides of the pit; and, extending from the ends of both pairs of railroad tracks, toward each other and over the pit, are two pairs of rail sections 4 which are in longitudinal alignment with each other and terminate in spaced relation. These rail sections 4 comprise upwardly facing channel members which provide wheel tread engaging portions 5 and flange guides 6.

The supporting frame comprises two longitudinal walls 8 which span the gap between the ends of rail sections 4, together with two transverse walls 7 which connect with the longitudinal walls to reinforce the supporting structure. Upper and lower feet, or gusset pads 9 are secured to the base of the pit by bolts 10, and the upper gusset pads 9 support the ends of the rail sections 4, and are secured thereto by suitable bolts 11, shown in Fig. 4.

The rock beam 18 is in the form of a casting, the general shape of which is shown in Fig. 23. The rock beam 18 comprises a generally semi-cylindrical central portion 17 and overhanging end portions 22. As shown in Fig. 3, the central cylindrical portion 17 spans the distance between the longitudinal walls 8, and it is supported for rotation about a transverse axis by rollers 13, shown in Fig. 5.

Extending inwardly from the corner margins of the transverse walls 7 are integrally formed lugs 12 which form, with the longitudinal walls 8, forks in which the rollers 13 are mounted. There are four of these rollers 13, one at each interior corner of the frame 7—8. In other words, the arrangement of Fig. 5 is duplicated at the opposite side of the device, as in general are all parts of the device, unless indicated to the contrary.

Wear blocks 21 are set into the external cylindrical surface of the central portion 17 of the rock beam 18 for cooperation with the rollers 13, as shown in Fig. 5. The spaced vertical webs 20, shown in Figs. 5 and 23, which reinforce the rock beam, also serve as stops which engage the lugs 12 to limit rotation of the beam.

The longitudinal walls 8 are cut away, as shown in Fig. 5, to accommodate the central portion 17 of the rock beam, and these walls also cooperate with the overhanging end portions 22 to restrict the rock beam against transverse movement, suitable bearing pads 19 being provided for this purpose, as shown in Fig. 3.

One of the transverse walls 7, which may be regarded as the forward end of the device, is provided with a suitable recess 14 (Fig. 21) in which is mounted a control panel 15 and a speed indicator 16, as shown in Fig. 3. Thus, the operation of the machine can be controlled by an operator who is standing in the pit 1.

The mechanism of the device includes mechanism for rotating the drive wheel 25, a spindle assembly for the finishing tool 57, together with operating means therefor, and tool locating means 201 together with elevator mechanism therefor.

These various mechanisms and assemblies, together with the operating means therefor, are located in various cavities formed in the rock beam 18, as shown in Fig. 23. Some of this mechanism is located in a central cavity 23, formed in the cylindrical portion 17, the cavity 23 being bounded at either end by wall portions 24.

The upper surfaces of these wall portions 24 form track sections 82 which span the gap between the track sections 4. The track sections are formed by longitudinally extending grooves 82a which receive the flange of the car wheel, as best shown in Fig. 23.

*Drive wheel mechanism*

The drive wheel mechanism comprises drive wheels 25, one for each car wheel 73, together with means for rotating the same, and retracting means for projecting and retracting the same into and out of alignment with the track sections 82.

The drive wheel 25 is located in a cavity in the form of a slot 85 which is formed in the wall portion 24 and which intersects the groove 82a, as shown in Fig. 23. As shown in Fig. 6, a bearing block 28 is located within the slot 85 and carries a bushing 27 in which is journaled the drive wheel shaft 26 to which the drive wheel 25 is suitably keyed. The shaft 26 is mounted for sliding movement and for rotation in the bushing 27. The means for rotating the drive wheel shaft 26 is shown in Figs. 6 and 8 and comprises suitable speed reducing means disposed between the shaft 26 and a motor 36. More specifically, a spur gear 29 is secured to the inner end of shaft 26 and meshes with a spur pinion 30 secured to a shaft and bearing assembly 31 upon which is fixed a worm gear 32. As shown in Fig. 8, a worm 33 is suitably journaled in a portion 34 of the rock beam, at a point between the ribs 20. A secondary worm and worm gear assembly 35 drives the worm 33, and the secondary worm and worm gear assembly is driven from the motor 36 by means of a suitable belt.

The spur pinion 30, and other parts between that part and the drive wheel 25, are duplicated for the opposite side of the rock beam, with the result that both drive wheels 25 may be rotated at the same speed by the common motor 36, and associated worm gearing.

The drive wheel 25 is designed to engage the flange of the car wheel 73. Therefore, means are provided to project the drive wheel 25 into the slot 82a during operation of the machine, and to retract the same from the slot into the inoperative position shown in Fig. 17. The retracted position is provided in order to permit a wheel 73 to run across the rock beam without interference with the drive roller 25.

The retracting mechanism is shown in Fig. 10, in which a portion of the cover plate 86 is broken away, the cover plate being suitably secured to the central portion 17 of the rock beam in order to enclose the mechanism contained in the main cavity 23.

The retracting mechanism comprises a fluid cylinder and piston assembly of which the cylinder is linked to the bearing block 28, and of which the piston is connected to a fork arm 38, pivoted at 38a. The fork arm 38 is connected to the slidably mounted drive wheel shaft 26 by means of a suitable collar so that actuation of the cylinder and piston assembly 37 will project or retract the drive wheel 25 into and out of the groove 82a. This retracting mechanism is duplicated for each side of the rock beam. Thus, each drive wheel can be axially positioned independently of the other, in order to secure proper alignment with the flanges of the respective drive wheels, the usual control valves being provided for this purpose.

*Spindle assembly*

The spindle assembly includes the finishing tool 57, suitable bearing means therefor, means to rotate the finishing tool, and retracting means whereby the tool may be projected into or retracted out of alignment with the track section 82.

Referring now to Figs. 23 and 11, it will be observed that the overhanging end portion 22 comprises a horizontal web member 87, in which is integrally formed a cylindrical portion 88. The portion 88 provides a bore 64 for accommodation of a slidably mounted sleeve 63. The bore 64 extends inwardly through the wall portion 24, and intersects the upper surface thereof, including the flange groove 82a.

The finishing tool 57 is preferably a milling cutter of the type shown in my aforesaid prior Patent 2,622,374, and as further exemplified by Thompson et al. Patent No. 2,645,003 dated July 14, 1953, but it is obvious that other types of finishing tools may be substituted for the milling cutter diagrammatically shown herein. The finishing tool is provided with a surface contour which corresponds to the shape of the tread and flange of a car wheel. As shown in Fig. 7, the finishing tool includes a tapered shank 56 which fits within a tapered socket formed at the inner end of a hollow spindle 55, the spindle being journaled in suitable bearings 89 within the sleeve 63. A draw bar 58 extends through the hollow spindle 55, the inner end being threaded into the shank 56, and the outer end being provided with a hand wheel 60. A collar 59 bears against a shoulder in the spindle so that rotation of the draw bar and hand wheel will draw the tapered shank into its socket to provide firm support for one end of the tool 57 and to provide a non-slipping engagement between the two.

The inner end of the finishing tool 57 is also supported by a bearing 61 which is mounted within a bearing block 62, the tool being provided with a suitably inwardly extending shank portion which is received within the bearing 61. The bearing block 62 is secured to the inner end of the sleeve 63, although the upper half of the sleeve is cut away at this point for a purpose hereinafter mentioned. The sleeve 63 is provided with a keyway 66 which is engaged by a key 65 in order to restrain the same against rotation of the bore 64 but at the same time permitting axial motion of the sleeve and of its associated parts above described.

The means for retracting the spindle assembly comprises a fluid cylinder and piston assembly 70 of which the piston is anchored to a relatively massive block 71 which is suitably secured to the rock beam within the main cavity 23. The piston 69 of the fluid actuating means 70 extends into and is secured to the bearing block 62 so that actuation of the operation of the fluid actuating means 70 will shift the tool from the operative or projected position shown in Fig. 7 into the inoperative or retracted position shown in Fig. 16. A suitable closure plate 67 is secured to the bearing block 62, and is provided with suitable seals to seal off the interior of the main cavity 23. In this connection, a suitable semi-cylindrical cap 90 is provided to close the upper half of the cavity 91 formed by the extension of the bore 64, through the end walls 24, and the cap 90 cooperates with this cavity to form a cylindrical chamber in which the closure plate 67 and bearing block 62 are slidably located.

Thus, operation of the fluid actuating means 70 in one direction will cause the tool 57 to be retracted from its Fig. 7 or operating position, in which it is in alignment with the track section 82 into its inoperative or Fig. 16 position and vice-versa. In the latter position, the bearing block 62 is located in the outer portion of the cavity 91, and, therefore, the upper surface thereof is cut away as shown in Fig. 16 in order to provide a contour which corresponds to the contour of the track section 82. More specifically, the upper surface of the bearing block 62 is provided with a groove 82b shown in Figs. 7 and 16, which registers with the groove 82a, thus providing a continuous section of track all the way across the rock beam 18. This permits successive trucks to be rolled across the rock beam as the wheel pairs of each are trued, one at a time.

The retracting mechanism described above is duplicated for each side of the rock beam, and the actuating means 70 is located in the main cavity 23.

The tool rotating means, however, is located on the overhanging end portion 22. Such rotating means includes a motor 50 shown in Figs. 2 and 4 which drives a suitable pulley 51 mounted at the outer end of shaft 52, as shown in Fig. 7.

As shown in Figs. 7 and 23, the rock beam casting includes at the outer end of the overhanging end portion 22 a vertical end plate 92. To this end plate is secured a flywheel housing 93. A flywheel gear 54 is located within the flywheel housing 93 and is mounted for rotation by means of bearing units 94 which are set into the end plate 92 and the outer wall of the housing 93. The hub portion of the flywheel 54 is splined as indicated at 95 for cooperation with the splined end of the hollow spindle 55, thus providing a driving connection for the hollow spindle, but permitting reciprocating motion of the same as it moves back and forth with the sleeve 63.

The shaft 52 is suitably journaled in wall portions of the housing 93 as shown in Fig. 7 and is provided at its inner end with a pinion 53 which meshes with gear teeth provided on the periphery of the flywheel 54. Thus, the spindle 55 is driven from motor 50 by means of the rotating elements 51, 53 and 54, a suitable drive belt being provided between the motor 50 and the pulley 51, and being enclosed by a belt housing guard 96.

A removable gauge 81 is suitably positioned on bearing block 62 to provide a means of properly locating the finishing tools 57 in their operative position with respect to the wheel 73 being operated on, to engage the inner surface of the flange of the wheel 73 when the finishing tool is being projected into its operative position.

The reciprocating sleeve 63 is locked when the finishing tool 57 is in operative position, by a pair of locking blocks 79 slidably positioned within a bore adjacent the spindle in the overhanging portion of the beam, as shown in Fig. 11. The lock blocks are wedged against the sleeve to effectively prevent movement of the sleeve 63 by means of a bolt 80 having oppositely threaded ends, each end being screw-threadedly received in its respective block so that by rotation of said bolt 80 the blocks may be made to move toward or away from each other and thereby respectively prevent or permit movement of the sleeve 63.

Tool locating means

Means are provided to locate the finishing tool 57 with respect to the axle 98 of the wheel 73 so that a true surface of revolution will be generated on the wheel 73.

The operation of the rock beam in this respect is best explained by reference to a link type of tool locating means shown in Figs. 24 and 25, and then by comparing the link type with the support type shown in Figs. 26 and 27. The advantage of the support type, as will be subsequently pointed out, is that it can be adjustably mounted on the rock beam 18 to regulate the depth of cut.

In Figs. 24–27, point A designates the car wheel axis, point B the tool axis, point C the drive wheel axis, and fulcrum F, the axis of rotation of the rock beam 18.

In Figs. 24 and 25, a strut or link 200 extends between the axle 98 and a suitable portion of the spindle assembly associated with tool 57. Thus, a predetermined distance is maintained between the axes A and B irrespective of the tilt of the rock beam 18, as represented by the angular inclination of broken line D. A comparison of Figs. 24 and 25, will indicate that the tilt or extent of rocking is determined by the periphery of the car wheel 73, that is to say by its radius at any particular point.

For example, at the beginning of a particular cut, or pass, the wheel diameter opposite the drive wheel 25 is greater than it is somewhat later when the new surface is being engaged by the drive wheel. The same principle applies with respect to flat spots and other irregularities, and irrespective of the direction in which the car wheel 73 is rotated.

In Figs. 26 and 27, the tool locating means comprises a support structure 201 carried by the rock beam 18 and comprising a header block 100 mounted on suitable columns 101. The header block 100 slidingly engages the undersurface of the journal box 99 of the axle 98. The surface 100A of the header block 100 is arcuate, being a cylindrical surface, the axis of which substantially coincides with the tool axis B. Thus, irrespective of the tilt of the rock beam 18, the distance between points A and B remains constant. The truck of which the axle 98 forms a part, is blocked against longitudinal movement in either direction by means to be subsequently described with the result that the axle 98 has a freedom of movement only in a substantially vertical direction. This results in relative longitudinal movement between the elements 99 and 100, which is represented in certain of the figures by a sliding contact, although in practice, suitable anti-friction means may be provided, as shown in Fig. 31.

Figures 31, 31A:
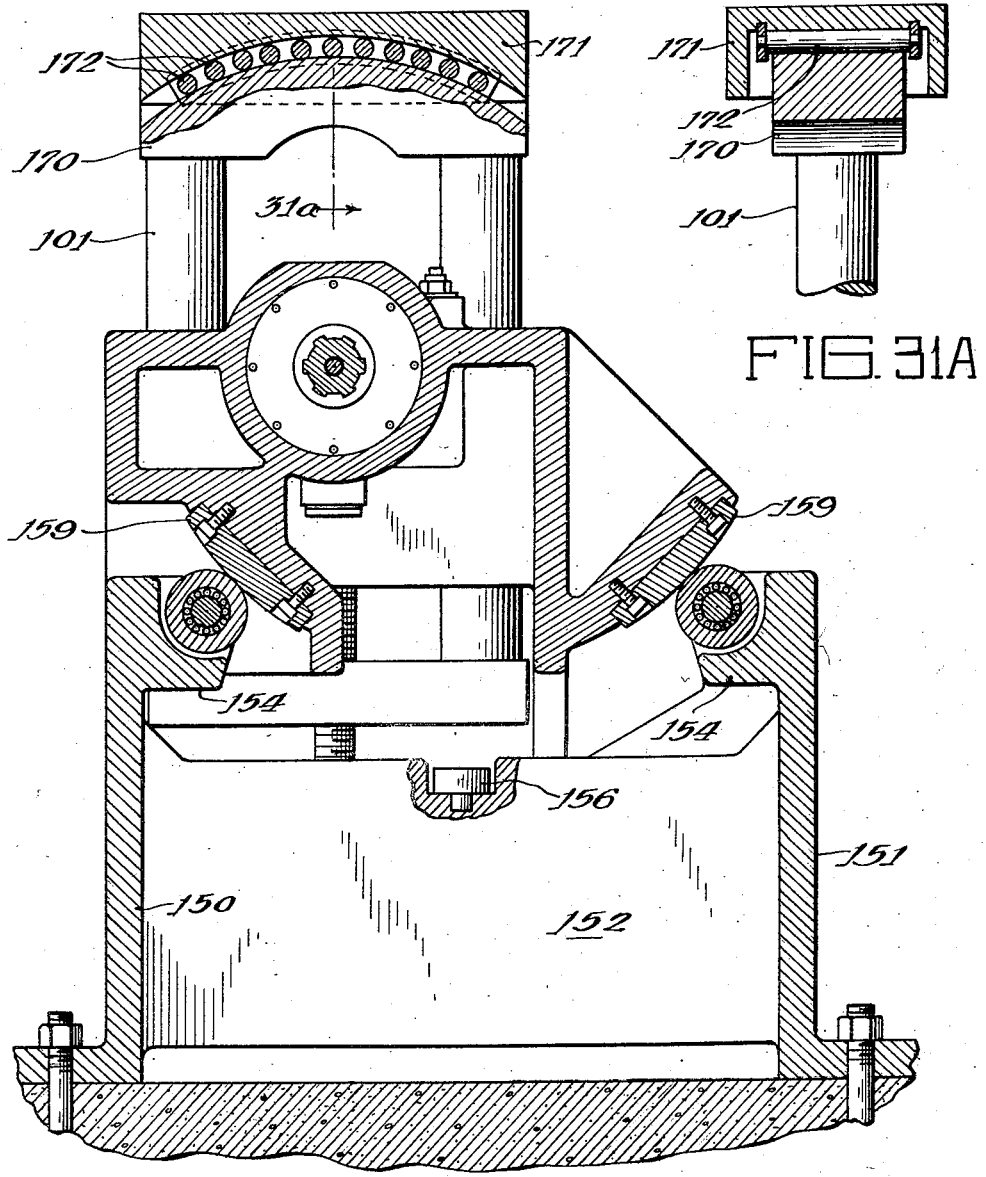
Fig. 31 is a vertical longitudinal section taken along line 31—31 of Fig. 30 showing the additional set of supporting rollers, and also showing a modified type of support structure.

In Fig. 31, the header block is designated by the reference numeral 170 upon which rests a contact member 171. Roller bearings 172 are provided between the cylindrical surface of elements 170 and 171 to provide substantially frictionless sliding motion. Thus, no sliding contact is present between the under surface journal box 99 and the upper surface of the contact member 171, on which the journal box rests.

The slight discrepancy between the center of the cylindrical surface 100A and the tool axis B occasioned by normal variations in car wheel radius encountered during the truing operation do not significantly affect the operation. However, due to the difference in size between ordinary car wheels and locomotive wheels, it may be desirable to provide interchangeable header blocks for use with each type of wheel.

Depth of cut adjustment

Elevator mechanism is provided to regulate the distance A—B since the desired diameter of the trued wheel will vary from wheel to wheel. This regulation of the distance A—B has the effect of varying the depth of cut of the tool 57, and it also permits the truing operation to be effected in two or more cuts or passes.

This elevator mechanism, or depth of cut adjustment, is shown in Fig. 9, and the driving means therefor is shown in Figs. 12 and 13, the former being located in the end portion 22 and the latter in the main cavity 23.

As shown in Fig. 23, the web portion 87 is provided with two vertical bores 124 located on opposite sides of the bore 64, and preferably symmetrical therewith.

The support structure 201 includes the aforementioned header block 100 and the columns 101, the latter being slidably received within the bores 124, suitable anti-friction bushings 102 being provided. The lower ends of the columns 101 are secured to a horizontally extending bottom block 103. Thus, a rigid support structure 201 is provided which is slidably mounted in the web portion 87.

As shown in Figs. 7, 9 and 23, the end portion 22 is provided with a depending skirt portion 125 which partially encloses the space beneath the web 87. Secured to the bottom edges of the three walls which make up the skirt portion 125 is a horizontally disposed thrust plate 126 in which is centrally located a lower thrust bearing 105.

The elevator mechanism includes a screw-threaded elevator shaft 104 which has its lower end received in the lower thrust bearing 105, and its upper end received in a corresponding upper thrust bearing 105'. An auxiliary thrust bearing 108 for downward thrust is also provided toward the upper end of the elevator shaft 104, the end portion 22 being considerably thickened at this point to accommodate elements 105' and 108.

A worm gear 106, located between the elements 105' and 108, is secured to the elevator shaft 104 for rotating the same. The worm gear 106 in turn is driven by a worm mounted at the outer end of a transversely disposed shaft 107, as shown in Fig. 9.

The wall portion 24 is provided with a transverse bore 127, as shown in Fig. 23, to accommodate the drive shaft 107.

Suitable driving mechanism, shown in Figs. 12 and 13, is located beneath the central portion 17 of the rock beam 18, and in this particular embodiment of the invention, the driving mechanism is a common driving mechanism for driving both of the shafts 109. However, means are provided so that either shaft may be selectively driven, since there are times when it may be desired to elevate one of the header block supports 100 independently of the other.

This common driving mechanism comprises a supporting bracket 111 which is suitably bolted to one of the webs 20. Suitably journaled in the supporting bracket 111 is a double clutch gear 113 which meshes with and is driven by a pinion 116 comprising the output of a fluid motor 115. The inner ends of the two elevator drive shafts 109 are received within the concentric shaft opening of the double clutch gear 113; however, the latter rotates independently of the shafts 109 and suitable bearings 110 are provided for this purpose. The double clutch gear 113 is provided with end clutch teeth which axially mesh with corresponding end clutch teeth formed on the driven clutch members 112. The latter are in the form of collars which are suitably keyed to the respective shafts 109. Suitable fluid operated cylinder and piston assemblies 114 are provided which engage a groove in the collars 112 to selectively actuate either or both of the collars 112 either into or out of engagement with the double clutch gear 113. Thus, the two header blocks 100 may be moved either up or down, either in synchronism with each other or independently of each other, in order to locate the tool 57 with respect to the wheel axis A for proper operation of the device, and also to regulate the depth of cut.

Beam positioning means

Means, shown in Fig. 5, are provided for determining the angular position of the rock beam 18 with respect to its axis F of rotation. Although during the finishing or milling operation, the rock beam 18 is free to seek its own position in accordance with the equilibrium of the various forces exerted thereon, it is necessary to provide separate beam positioning means for use during set up.

Two separate beam positioning means are provided, one comprising a locking device to lock the beam in its horizontal position so that the track sections 82 are aligned with the track sections 4, and the other comprising a tilting device to adjust the angular position of the beam after the locking means has been released.

The locking means comprises a fluid cylinder and piston assembly 117 which is mounted in the forward transverse wall 7 as shown in Figs. 3 and 5. This fluid actuating means 117 includes a piston 118 which can be projected into a socket 119 formed in the central portion 17 of the rock beam 18. When the piston 118 is in its projected position, as shown in Fig. 5, the beam is locked in its horizontal position thus providing a continuous track section 4—82—4 which connects the standard railroad tracks 3—3. Also, when the beam is in its locked position, the header block 100 may be elevated into engagement with the under-surface of the journal box 99 and the wheel 73 elevated sufficiently to permit projection of the finishing tool 57 and the drive wheel 25 into alignment with the wheel 73, the entire load on the wheel at this time being taken up by the support structure 201, and being suitably distributed between the supporting rollers 13 and the piston 118.

The tilting means comprises a fluid cylinder and piston assembly 120, also shown in Fig. 5, the cylinder end of which is pivotally mounted on a shaft 121 which projects inwardly from the longitudinal wall 8, and the piston 122 of which is pivotally attached to a bracket 123 secured to the lower edge of the webs 120. Thus, when the locking piston 118 is retracted, the angular position of the rock beam 18 may be adjusted as required during the set up operation. Also, at the conclusion of the finishing operation, the rock beam may be positioned so that the socket 119 is aligned with piston 118 so that the rock beam 18 can again be locked in its horizontal position.

The surface speed indicator

During the finishing operation, it is desirable to adjust the depth of cut from time to time to the end that both wheels, when trued, will be of the same diameter. In this connection, indicating means is provided to compare the relative surface speeds of the two wheels, since surface speed is proportional to wheel diameter, when both wheels are fixed to a common axle. This indicating means comprises a pair of rollers, each forcibly held against a flange of a wheel being trued, each roller being connected to one end of a flexible shaft, the other ends of which shafts are connected to a pair of contiguous revolving indicators mounted on a common shaft, and marked so that their relative speed can be readily observed. Thus if both indicators are revolving at the same speed, the diameters of the two wheels are identical.

As indicated in Figs. 10, 21 and 22, the indicating assembly for one wheel is shown, and it is understood that a similar assembly is provided for the other wheel. Each assembly comprises a friction roller 130, mounted on one end of a hollow lever arm 131, the other end of which is suitably pivoted at 132 to the beam. Intermediate the ends of the arm 131 is mounted the outer end of a piston 133 of the cylinder 134 suitably fulcrumed on a bracket 135 suitably mounted on the beam. In the lever arm 131 is mounted one end of a flexible cable 136 which is attached to and rotated by the roller 130. This cable extends to and drives the gear 137 in a train of speed increasing gears connected to the indicator 16, all suitably mounted in a housing in the beam casting. The indicator wheels 16 are identical and mounted adjacent to each other on a common axis and provided with alignable markings as a means to compare the relative movement of the wheels 16.

Wheel blocking means

In order that the truck may be blocked from forward movement during the truing operation, wheel blocking means are provided for engagement with those wheels 73' which are not being trued, and which are resting on the rail sections 4. The wheel blocking means comprise an integral blocking member 139 shown in Figs. 18–20, and it is understood that two of such blocks are required, one of right hand design, as shown, and the other of left hand design.

The integral blocking member 139 rests in the channel-shaped rail section 4 and is of a complex shape so as to provide an upwardly facing wedge surface 140, an inwardly facing cam surface 141, and an outwardly engaging flange surface 143.

The wedge surface 140 provides the actual wheel block which is engaged by the periphery of the flange. The blocking member 139 is restrained against forward movement by one or more bolts 142 which extend through the flange guide 6 and into engagement with the inwardly facing cam surface 141.

Thus, after the truck is properly positioned, with the journal boxes 98 in alignment with the support block 100, the integral blocking member is moved forwardly as far as it can and the wedge surface 140 is firmly wedged under the periphery of the wheel flange, the reference numeral 73 designating the wheel to be blocked. This operation is performed on both the right and left wheels, and the bolts 142 in both track sections are tightened up simultaneously so that the flange engaging surfaces 143 of both blocks are urged outwardly against the inner surface 145 of the flange on each wheel. Thus, the inner surfaces 145 are frictionally engaged with the result that in addition to the blocking action provided by the wedge surfaces 140, the wheels are frictionally locked against movement in either direction. In this connection, the slope of the cam surface 141 is sufficiently small as to prevent, under normal stress, any reverse movement of the parts which would release the frictional engagement between the inner surfaces 145 and a flange engaging surface 143. The shoulder 144 prevents any tendency of the integral blocking member 139 to rotate with the wheel about its axis.

Figure 35:
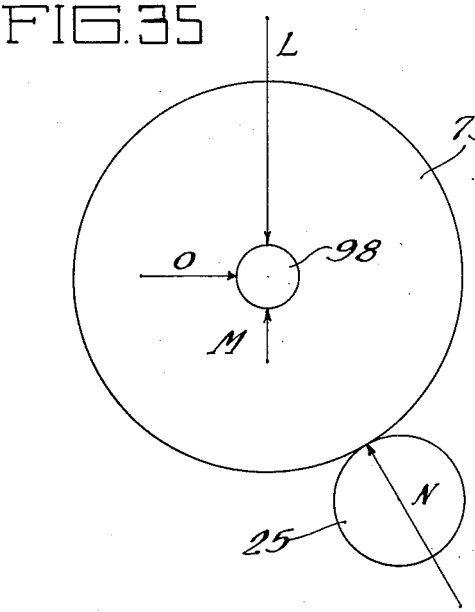
Fig. 35 is a force diagram showing the manner in which the load on the axle is distributed between the support structure 201 and the drive wheel 25.

Although Fig. 2 illustrates a truing operation being performed on the rear wheels of a truck, in which event the front wheels are blocked, when the front wheels are being trued and the rear wheels blocked, the integral blocking members 139 are still placed forwardly of the rear wheels since the purpose of the blocking means is to prevent forward movement of the truck, thus developing the reaction shown in Fig. 35 which offsets the horizontal component of the force N exerted by the drive wheel 25. The orientation of these forces is identical, irrespective of whether the front or rear wheels of a truck are being trued.

Split beam modification

Figs. 28–34 show a modification in which the beam is split into two separate parts, one for each wheel. In this modification, each part is independently supported so that each beam can seek its position of equilibrium independently of the other with the result that the operation is somewhat facilitated when the difference in wheel diameter exceeds the depth of cut on the larger.

When this work condition occurs in the single beam construction, a torsional stress is imposed on the rock beam, thus requiring a heavier construction. In the split beam construction, on the other hand, no such torsional stress is present since each beam is free to seek its own position of equilibrium, independently of the other.

Figs. 28 and 30 show the general arrangement of the modified form of construction, in which two separate beams 148, 149 are substituted for the rock beam 18. The modification contemplates providing separate supporting means for each rock beam, as shown in Fig. 29, and the substitution of separate drives for the various components in those instances where a common drive is shown in Figs. 1–23. In all other instances, the construction is substantially identical and, therefore, the identical reference numerals will be employed in identifying the corresponding parts in the modification.

With reference now to Fig. 29, in addition to the transverse and longitudinal walls, 7 and 8, respectively, the supporting frame also includes transverse wall extensions 150 and 151, these parts being duplicated for each side of the machine, and also auxiliary longitudinal walls 152. In addition to the supporting rollers 13, a second set of supporting rollers 153 is provided which are mounted in suitable forks 154, one fork being formed at the outer end of the wall extension 150 and the other at the outer end of the wall extension 151. Thus, each beam is independently supported by two sets of rollers, 13 and 153, for rotation about the beam axis C.

Each rock beam is restrained against transverse movement by rollers 155 and 156, mounted on vertical axes. Roller 155 is mounted on the upper edge of the longitudinal wall 8, and roller 156 is mounted on auxiliary longitudinal walls 152 by means of a suitable lug, as shown in Fig. 32. These rollers 155 and 156 engage wear plates 157 and 158, respectively, secured to a suitable depending portion of each rock beam. In other respects, the relationship of the parts and their operation, is the same as that shown in Fig. 5.

As shown in Fig. 31, each beam is provided with wear blocks 159, for cooperation with the supporting rollers 153, these wear blocks 159 being in addition to the wear blocks 21, shown in Fig. 5.

In the embodiment of Figs. 1–23, the only common drive means provided is the fluid motor 115 for operating both support structures 201 either simultaneously or independently of each other, and the common drive for the drive wheels 25. In the split beam modification, separate motors 36' are provided for each drive wheel 25, and each motor 36' drives a worm shaft 160, as shown in Figs. 32 and 33, through a reduction worm gearing 161. Each worm shaft 160, in turn drives a worm gear 162 which is mounted on a shaft 163, these parts corresponding to the worm gear 32, and the shaft 31, of Fig. 6, respectively. Beyond the shaft 163 the parts are identical to the construction shown in Figs. 6, 8 and 10, including the projecting and retracting members 37—38.

Figs. 33 and 34 show a separate fluid actuated motor 115' for each of the shafts 109, the output shaft of the motor 115' being connected to the shaft 109 by means of gearing 164. Since separate driving means are provided for each shaft, no clutching mechanism is necessary, as in the embodiment of Figs. 1–23.

Forces acting on rock beam

Figure 36:
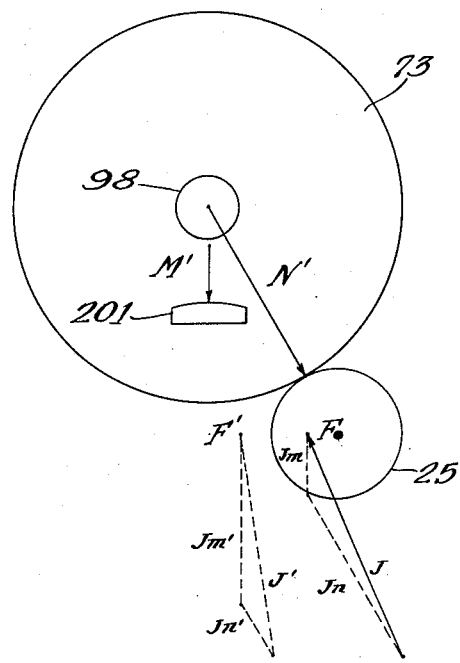
Fig. 36 is a force diagram showing the forces acting on the rock beam.
Figure 37:
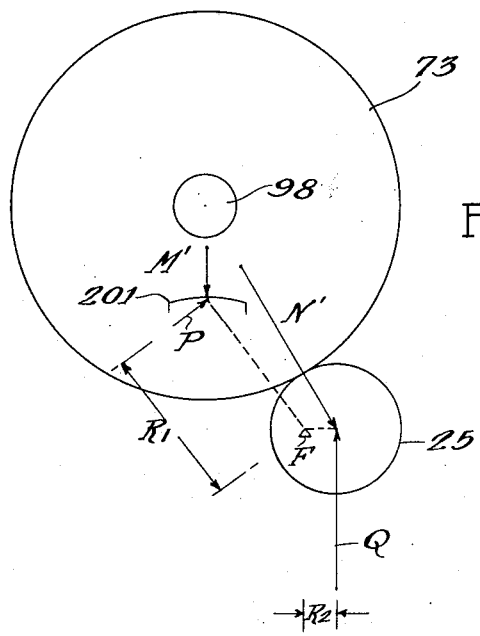
Fig. 37 is a force diagram showing the force moments of the rock beam with respect to its axis of rotation.

The equilibrium of the forces involved is illustrated in the force diagrams of Figs. 35–37. In Fig. 35 the load L on the axle 98 is taken up partially by the reaction M of the journal box 99 and partially by the force N exerted on the car wheel 73 by the drive wheel 25. The wheel block 139 exerts a substantially horizontal reaction O which offsets the horizontal component of the force N.

Fig. 36 shows the forces acting on the rack beam 18, the axis of rotation of which is designated by F. These forces consist of the vertical force M' exerted by the journal box 99 on the support structure 201, the reaction N' of the car wheel 73 against the drive wheel 25, and the reaction J exerted by the supporting frame on the rock beam, which force can be considered as acting through the axis F. The relationship of these three forces is indicated by the force triangle in which Jm and Jn are components of the reaction J which components are parallel to forces M and N, respectively. Thus, the angular relationship determines the relative magnitude of the components.

If the axis F were shifted to the left, as illustrated by the point F', the angular relationship would be as shown in the dotted line triangle in which the vertical component Jm' would be much larger than the drive wheel component Jn'. Thus, by properly locating the axis F with respect to the drive wheel axis and the axis of the car wheel 73, it is possible to obtain any desired proportioning of magnitude between the forces M and N.

In Fig. 37, which shows the force moments of the rock beam 18 with respect to the axis F, the force P is the lever force component of the force M exerted by the support structure 201 on the journal box 99, which component acts in a direction perpendicular to the radius $R_1$.

The force Q is the lever force component of the force N exerted by the drive wheel 25 on the car wheel 73, which component is applied at the axis of the drive wheel and acts in a direction perpendicular to the radius $R_2$.

The radii $R_1$ and $R_2$, therefore, represent the lever arms of the forces P and Q, respectively, the moments P times $R_1$, and Q times $R_2$ being equal to each other and representing the equilibrium of the rock beam. This diagram also shows that by proper proportioning of the lever arms, as by shifting the location of the axis F, the force N may be of a magnitude greater or less than the weight component M'. The force N, exerted by the drive wheel 25, need only be of sufficient magnitude to prevent slippage at the point of driving engagement. However, since the frictional coefficient of the elements 25 and 73 which are in rolling contact with each other, will in most cases be considerably less than the frictional coefficient between the finishing tool 57 and the wheel 73, it will generally be found necessary to so proportion the parts that the drive wheel thrust N is considerably greater than the weight component M'.

According to the present invention, it is thus possible to develop a driving force which is of much greater magnitude than the work force.

Operation

To summarize the operation, which has previously been described in connection with the detailed description of the various parts and subassemblies, the principal operations are locating the wheel pair on the truing machine, set up, and wheel truing.

In locating the wheel pair to be trued, the rock beam is first located in its horizontal position by the locking means 117—118—119 to provide a continuous track section. Then the wheel pair is centered over the bearing block 62, and the truck may be blocked against movement in either direction by application of the wheel blocking means 139—145 to the wheels 73'.

Set up includes the steps of elevating the header block 100, or the contact member 171, as the case may be, into engagement with the undersurface of the journal box 99 while the beam is still locked; and then raising the wheels 73 sufficiently to permit projection of the drive wheel 25 and the finishing tool 57 into operative position. Then the header blocks are lowered until the wheel 73 almost contacts the finishing tool 57. The tilting means 120—122 is then energized to maintain the rock beam 18 in its horizontal position as the locking piston 118 is retracted. Then the tilting means is actuated, or the pressure gradually released, to permit the rock beam to seek its position of equilibrium in which the drive wheels 25 contact the flanges of the wheels 73. Further and final adjustment of the alignment of the tool 57 with the wheel 73 may be made at this time with the aid of the removable gauge 81.

The truing operation includes the steps of lowering the header blocks 100 while the tool 57 and wheel 73 are in rotation to provide the proper depth of cut adjustment, and the truing operation may be accomplished in one or more passes, each pass comprising a complete revolution of the wheel 73. The rock beam automatically adjusts itself to any variations in wheel diameter without changing the depth of the cut as determined by the tool locating means, as previously pointed out.

The foregoing operations are performed for the elements at both ends of the rock beam 18 and with respect to each wheel 73 of the wheel pair. If the surface speed indicator shows variations in tool diameter, the header block 100, which is associated with the larger wheel is lowered until the diameters of the two wheels are identical.

In the case of the split beam modification, the operation is substantially identical with respect to truck location, set up, and truing. However, if one wheel is considerably larger than the other, it is possible to adjust the header block 100 which is associated with the smaller wheel so as to maintain the wheel 73 out of contact with the finishing tool 57 while the larger wheel is being cut down to size, without imposing undue torsional stress on the mechanism as might otherwise be the case where only a single rock beam is provided. Since each work beam 148 and 149 is independently mounted, that one associated with the smaller wheel will rotate into its position of equilibrium in which its drive wheel will engage the smaller wheel 73, even though the latter is not engaged by the finishing tool 57.

According to either embodiment, the beam axis F may be so located as to provide any desired proportioning of the forces M' and N to the end that the work, or wheel 73, will be urged into engagement with the finishing tool 57 with sufficient force as to effect a smooth and vibration free cutting operation, and at the same time to urge the drive wheel 25 into engagement with the work sufficient force as to rotate the same without slipping.

The disclosure of my aforesaid copending application, Serial No. 291,159 filed June 2, 1952, is hereby incorporated by reference into this application, insofar as it is not inconsistent with this application.

Although only preferred ambodiments of my invention have been shown and described herein, it will be understood that various modifications and changes may be made in the constructions shown without departing from the spirit of my invention as pointed out in the appended claims.

I claim:

1. In a device for truing wheels while mounted in a truck assembly of railway rolling stock, a frame, a rock beam supported on said frame and having portions engaging said wheels to provide a partial support therefor, means on said rock beam for supporting a pair of finishing tools, and wheel driving means supported by said rock beam for engaging the wheels to be trued to provide a partial support therefor, the axis of rotation of the rock beam being horizontal and being so located between vertical planes running through the axes of rotation of the finishing tool supporting means and the means for rotating the wheels to be trued so that a force exceeding more than half of the weight on the rock beam is exerted by said means for rotating the wheels against the peripheries of wheels to be trued.

2. In a device for truing a pair of wheels while mounted in a truck assembly on railway rolling stock, said truck assembly including a second pair of wheels, a frame, a rock beam carried by said frame, a support for partially supporting the wheels to be trued, carried by said rock beam, a second support carried by said rock beam and comprising drive rollers laterally spaced from said first mentioned support for partially supporting on the periphery thereof the wheels to be trued, the axis of rotation of said rock beam being spaced from a vertical plane passing through the center of said second support, and wheel locking means engaging said second pair of wheels of said truck assembly to prevent movement thereof so as to counteract the horizontal component of reaction on said second support.

3. In a device for truing a pair of wheels while mounted in a truck assembly on railway rolling stock, said truck assembly including a second pair of wheels, means for supporting the wheels being trued, comprising a rock beam, a reciprocable support carried by said rock beam, means for reciprocating said support to move the same into engagement with said truck assembly for partially supporting the wheels to be trued, a second support carried by said rock beam and comprising drive rollers spaced from said first mentioned support for partially supporting on the periphery thereof and rotating the wheels to be trued, the axis of rotation of said rock beam being spaced from a vertical plane passing through the center of said second support, and means to counteract the horizontal component of reaction on said second mentioned support.

4. In combination, a pair of spaced rails, a pit below the rails, a supporting frame within the pit, a rock beam having overhanging ends supported within said frame, a depth of cut adjuster assembly supported in said frame, a cutter spindle and drive mechanism assembly supported within said beam, the axis of rotation of the rock beam being between the axes of rotation of the cutter spindle and drive mechanism so that the majority of the weight on the rock beam is on the drive mechanism.

5. In combination, a pair of spaced rails, a pit below the rails, a supporting frame within the pit, a rock beam having overhanging ends supported in said frame, a cutter spindle and drive mechanism assembly supported within said beam, a depth of cut adjuster assembly supported within said beam, the axis of rotation of the rock beam being between the axes of rotation of the cutter spindle and drive mechanism so that the weight on the rock beam is unequally distributed on the drive mechanism and depth of cut adjuster assembly.

6. In a device for truing a pair of wheels while mounted in a truck assembly on railway rolling stock, a rock beam adapted to support the wheels to be trued, roller means for supporting said rock beam, a pair of rail sections carried by said rock beam for cooperation with the pair of wheels to be trued, and a pair of spindles mounted in said rock beam for supporting a pair of finishing tools on a common axis, said rail sections being interrupted to accommodate said finishing tools, and means for axially shifting said spindles to retract said finishing tools from an operative position in which said finishing tools are aligned with said interrupted rail sections to an inoperative position.

7. In a device for truing a pair of wheels while mounted in a truck assembly on railway rolling stock, a rock beam adapted to support the wheels to be trued, and a pair of axially aligned spindles mounted in said rock beam, a pair of finishing tools supported on said spindles, said spindles being movable to optionally retract said finishing tools within said rock beam, each of said finishing tools being mounted in a bearing housing, said bearing housings being retractable with the finishing tools and contoured to provide rail segments for supporting said wheels when said finishing tools are retracted.

8. In a device for truing a pair of wheels while mounted in a truck assembly on railway rolling stock, a rock beam adapted to support the wheels to be trued, and a pair of spindles mounted in said rock beam, a pair of finishing tools each supported on a spindle, means to move said spindles so as to optionally retract said finishing tools within said rock beam, each of said finishing tools being mounted in a bearing housing, said bearing housings being retractable with the finishing tools, and gauges upon said bearing housings each engageable with a stop surface to limit movement of said finishing tools in one direction.

9. In a device for truing a pair of wheels while mounted in a truck assembly on railway rolling stock, a rock beam adapted to support the wheels to be trued, a pair of rail sections carried by said rock beam for cooperation with the wheels to be trued, a pair of spindles mounted in said rock beam for supporting a pair of drive rollers on a common axis to rotate the wheels to be trued, said rail sections being interrupted to accommodate said drive rollers, and means for axially retracting said spindles to shift said drive rollers from an operative position in which they are in substantial alignment with said interrupted rail sections to an inoperative position in which they are transversely displaced from said interrupted rail sections.

10. In a device for truing wheels of railway rolling stock, a frame, a rock beam, means mounting said rock beam on said frame for rocking motion, a pair of drive rollers mounted on said rock beam to rotate the wheels to be trued, a pair of finishing tools mounted on said rock beam, and separate means for axially moving said drive rollers and said finishing tools from an operative position in which they are in alignment with the wheels to be trued, to an inoperative position laterally displaced from said plane.

11. In a device for truing wheels of railway rolling stock, a frame, a rock beam having overhanging ends, provided with arcuate under surfaces, opposite walls of said frame provided with rollers supporting said arcuate surfaces, a pair of drive rollers mounted on said rock beam to rotate the wheels to be trued, a pair of finishing tools mounted on said rock beam, and separate means for axially moving said drive rollers and said finishing tools from an operative position in which they are in alignment with the wheels to be trued, to an inoperative position laterally displaced from said plane.

12. In a device for truing wheels of railway rolling stock while mounted in a truck assembly, a frame, a rock beam supported on said frame, and adapted to support the wheels to be trued, a pair of drive rollers mounted on said rock beam to rotate the wheels to be trued, a pair of finishing tools mounted on said rock beam, and reciprocable means supported by said frame and axially engageable within a socket in said beam when said beam is in a certain position, in which said socket and said reciprocable means are axially aligned in order to optionally hold said beam in said position.

13. The combination set forth in claim 12, and means attached to said frame and to said rock beam to optionally rock said rock beam to bring said socket into alignment with said reciprocable means.

14. In a device for truing wheels of railway rolling stock while mounted in a truck assembly, a frame, a rock beam, means mounting said rock beam on said frame for rocking motion, a pair of rail sections carried by said rock beam for cooperation with the wheels to be trued, a cutter spindle and drive mechanism assembly supported within said rock beam, said rail sections being interrupted to accommodate said assembly, and means carried by said rock beam for axially moving said assembly from an operative position in alignment with the rail sections, to an inoperative position laterally displaced from said rail sections.

15. In a device for truing wheels of railway rolling stock while mounted in a truck assembly, the combination of a frame, a rock beam, means mounting said rock beam on said frame for rocking motion, a pair of finishing tools, means on said rock beam for supporting said pair of finishing tools, means supported by said rock beam for rotating the wheels to be trued, and a depth of cut adjuster assembly supported within said beam, said depth of cut adjuster assembly including a header support projecting from said rock beam so as to rock therewith, having an upper surface for engaging a journal box of the wheel to be trued, said surface being arcuate so that the distance between one of said finishing tools and the center of the wheel to be trued is not appreciably changed by the rocking of said rock beam, and means for moving said header support into engagement with said journal box.

16. In a device for truing wheels of railway rolling stock while mounted in a truck assembly, the combination of a frame, a rock beam supported on said frame, a pair of finishing tools, means on said rock beam for supporting said pair of finishing tools for engagement with the wheels to be trued, drive wheels supported by said rock beam for frictionally engaging and rotating the wheels to be trued, means carried by said frame for supporting said rock beam for rocking movement, and a depth of cut adjuster assembly supported within said beam, said depth of cut adjuster assembly including a header support projecting from said rock beam and rocking therewith, and having a portion engaging the underside of the journal box of one of the wheels to be trued, the axis of rotation of said rock beam being located between vertical planes running through said journal box engaging portion and the center of that one of said driving wheels which is disposed adjacent said header support whereby the weight of said wheels to be trued is distributed between said drive wheels and said header support, the major portion of said weight being transmitted to said header support to cause said drive wheels to react against the peripheries of said wheels to be trued, and in a direction substantially radial to the center to be trued, with a force substantially in excess of that portion of said weight which is transmitted to said drive wheels.

17. In a device for truing wheels of railway rolling stock while mounted in a truck assembly, a frame, a rock beam having overhanging ends and adapted to support the wheels to be trued, means mounting said rock beam on said frame for rocking motion, a cutter spindle and drive mechanism assembly supported within said rock beam, a pair of reciprocably movable supports carried by said beam, and means for moving said supports into engagement with corresponding parts of said truck assembly to elevate said wheels in relation to said beam.

18. In a device for truing a pair of wheels while mounted on a truck assembly on railway rolling stock, a fixed frame, a rock beam adapted to support the wheels to be trued, means mounting said rock beam on said frame for rocking motion, a pair of reciprocably movable supports carried by said rock beam and engageable with said truck assembly when said wheels are supported on said beam, means to move said supports into engagement with said assembly to elevate said assembly in relation to said rock beam, and a cutter and drive mechanism assembly carried by said rock beam and movable into an operating position for cooperation with said wheels when said truck assembly has been elevated.

19. In a device for truing wheels of railway rolling stock while mounted in a truck assembly, a pair of spaced rail sections, a frame below and supporting said rail sections, a rock beam having overhanging ends, means mounting said rock beam on said frame for rocking motion, a cutter spindle and drive mechanism assembly supported within said rock beam, said rail sections being interrupted to accommodate said assembly in the operative position thereof, and means for axially moving said assembly from an operative position in alignment with the rail sections, to an inoperative position laterally displaced from said rail sections, and means on said beam formed so as to be congruent with said rail sections and movable into alignment with said rail sections when said assembly is moved to inoperative position.

20. In a device for truing a pair of wheels while mounted in a truck assembly on railway rolling stock, a pair of spaced rails, a frame below and supporting said rails, a rock beam having overhanging ends, means mounting said rock beam on said frame for rocking motion, means formed congruently with said spaced rails carried by said rock beam, a cutter and drive mechanism assembly carried by said rock beam, means to move the cutter and the drive mechanism into and out of an operating position in alignment with said spaced rails, said first mentioned means being movable into alignment with said rail sections when said cutter and drive mechanism are moved to inoperative position, said rails being interrupted longitudinally to accommodate said means and said mechanism.

21. A wheel truing machine comprising a supporting frame, a transverse beam, a finishing tool mounted on said beam, a drive roller mounted on said beam and spaced from said finishing tool, means for rotatably mounting said beam in said supporting frame for rotation about a transverse axis located between said finishing tool and said drive roller whereby rocking movement of said beam will cause said drive roller to exert a thrust against the periphery of the wheel to be trued, and tool locating means for maintaining a predetermined distance between the axis of said wheel to be trued and the axis of said finishing tool.

22. A wheel truing machine as claimed in claim 21 in which said tool locating means includes a support structure having a portion engaging the undersurface of the journal box of the axle of the wheel to be trued, said support structure being adjustably mounted on said beam, and elevator means for regulating the position of said support structure with respect to said beam in order to regulate said predetermined distance.

23. A wheel truing machine as claimed in claim 22 in which said support structure includes a header block having a surface which is arcuate, the axis of which is in substantially the same vertical plane with the axis of said finishing tool.

24. A wheel truing machine as claimed in claim 23 in which said support structure also includes a contact member supported by arcuate surface of said header block, and anti-friction means disposed between said arcuate surface and said contact member whereby to facilitate rotation of said beam and support structure with respect to said contact member and said journal box.

25. A wheel truing machine as claimed in claim 21 which includes a tilting device to adjust the angular position of said beam with respect to the frame in which it is mounted.

26. A wheel truing machine as claimed in claim 21, including rail sections disposed above said supporting frame and located longitudinally adjacent said transverse beam, track sections formed on the upper surface of said beam and aligned with said rail sections and connecting the same when said beam is in its horizontal position, a locking device to lock said beam in its horizontal position, and a tilting device for adjusting the angular position of the beam after said locking device has been released.

27. A wheel truing machine as claimed in claim 21, in which said tool locating means includes an adjustable support structure mounted in said beam, locking means for locking said beam in a fixed position with respect to its supporting frame, and elevator means for said support structure whereby a truck may be elevated by operation of said elevator means when said locking means is in its operated position.

28. A wheel truing machine comprising a frame, a rock beam mounted on said frame for rotation about a transverse axis, a track section on said rock beam, a drive wheel aligned with one rail of said track section, a finishing tool aligned with said rail, the axis of rotation of said rock beam being located between said finishing tool and said drive wheel, and tool locating means carried by said rock beam for maintaining substantially constant distance between the axis of the wheel to be trued and the axis of said finishing tool, said tool locating means including a support structure for engaging the underside of the journal box of the axle of the wheel to be trued, and providing a lever arm with respect to said axis of rotation of said rock beam such that said drive wheel is urged into engagement with said car wheel with a force sufficient to provide driving engagement.

29. A wheel truing machine comprising a supporting frame, two transverse beams arranged in end to end relationship, a finishing tool mounted on each beam, a drive roller mounted on each beam and longitudinally spaced from said finishing tool, means for independently mounting each beam in said supporting frame for independent rotation about a transverse beam axis, said beam axis being located between said finishing tool and said drive roller in each instance whereby rocking movement of each beam will cause each drive roller to exert a thrust against the periphery of the wheel to be trued, and tool locating means mounted on each beam for maintaining a predetermined distance between the axis of each wheel of a wheel pair to be trued and the axis of the corresponding finishing tool.

30. A wheel truing machine comprising a frame, two rock beams mounted on said frame arranged in end to end relationship for independent rotation about a common transverse axis and each having a rail so that both rock beams when locked in a horizontal position provide a track section to accommodate a wheel pair to be trued, each rock beam comprising a drive wheel mounted thereon and aligned with one rail of said track section, a finishing tool mounted thereon and aligned with said rail, said axis of rotation being located between said finishing tool and said drive wheel, and tool locating means carried thereby for maintaining substantially constant distance between the axis of the wheel to be trued and the axis of said finishing tool, said tool locating means including a support structure for engaging the underside of the journal box associated with one wheel of said wheel pair, and providing a lever arm with respect to said axis of rotation such that said drive wheel is urged into engagement with its associated wheel with a force sufficient to provide driving engagement, and is so urged independently of the force exerted by the drive wheel of the other rock beam against the other wheel of said wheel pair.

31. In a wheel truing device embodying a finishing tool, truck blocking means for positioning a car wheel in operative engagement with said finishing tool, and a drive wheel for rotating the work, the combination of means for developing a force between said drive wheel and said work which is sufficient to overcome the friction between said work and said finishing tool, said means comprising a common support member for said finishing tool and said drive wheel, and means for supporting said common support member and for permitting rotation of the same about a transverse axis, said common support member including journal box engaging means to take up a portion of the weight of the wheel, said supporting means being so located that said transverse axis is disposed between the axis of said finishing tool and said drive wheel, and closer to the latter than to said journal box engaging means, to the end that a large moment can be developed for urging said drive wheel against said work.

32. A wheel truing machine comprising a supporting frame having a forward end and a rearward end, a pair of rail sections mounted at said forward end, a pair of rail sections mounted at said rearward end, the corresponding rails of each pair being aligned with each other and terminating in spaced relation to provide a gap, a rock beam located in said gap, means for rotatably mounting said rock beam on said supporting frame for rotation about a transverse beam axis, a track section carried on the upper surface of said beam and including wheel supporting portions and adjacent flange receiving grooves aligned with the corresponding rails of said rail sections and cooperating therewith to provide a continuous portion of track when said beam is maintained in a predetermined horizontal position, a finishing tool mounted on said beam and movable between a projected position in which it is substantially aligned with one of said rail supporting portions and its adjacent groove, and a retracted position, said rail supporting portion and adjacent groove being interrupted to accommodate said finishing tool, a drive roller mounted on said beam spaced from said finishing tool, and movable between a projected position in which it is aligned with said last-mentioned groove, and a retracted position, said groove being interrupted to accommodate said drive roller when in its projected position and said wheel supporting portion being continuous adjacent said interrupted groove portion, a formed block connected to said finishing tool and movable therewith so as to occupy the interrupted portion of said wheel supporting portion and adjacent groove when said finishing tool is in its retracted position, said formed block providing an upper surface which is congruent to the surface configuration of said wheel supporting portion and adjacent groove to provide a continuous track section across said rock beam when said finishing tool is in its retracted position to facilitate the positioning on said rock beam of a wheel to be trued, means for locking said rock beam in said predetermined horizontal position during the positioning of said wheel, means carried on said rock beam for elevating said wheel clear of said wheel supporting portion and adjacent groove to permit movement of said finishing tool and said drive wheel from retracted position into projected position and for lowering said wheel into an operative position with respect to said finishing tool, means for releasing said locking means whereby said rock beam will be permitted to rotate about said beam axis in order that said drive roller may move into contact with the flange of said car wheel, said wheel elevating means including means to maintain a substantially constant distance between the axis of said wheel and the axis of said finishing tool during rotation of said beam, and said beam axis being located between the axes of said finishing tool and said drive roller whereby the force exerted on said wheel elevating means will cause said drive roller to exert against the wheel to be trued a thrust of a sufficient magnitude to provide driving engagement, and means for rotating said drive roller and finishing tool.

References Cited in the file of this patent

UNITED STATES PATENTS

| | | |
|---|---|---|
| 1,171,812 | Vial | Feb. 15, 1916 |
| 1,511,122 | Gutmann | Oct. 7, 1924 |
| 1,627,074 | Blair et al. | May 3, 1927 |
| 1,748,585 | Reed et al. | Feb. 25, 1930 |
| 1,789,975 | Heil | Jan. 27, 1931 |
| 2,017,875 | Theler | Oct. 22, 1935 |
| 2,175,783 | Rose | Oct. 10, 1939 |
| 2,206,842 | Indge | July 2, 1940 |
| 2,316,058 | Flygare et al. | Apr. 6, 1943 |
| 2,479,974 | Sendzimir | Aug. 23, 1949 |
| 2,539,107 | Sectish | Jan. 23, 1951 |
| 2,546,225 | Julian et al. | Mar. 27, 1951 |
| 2,547,832 | Newman | Apr. 3, 1951 |
| 2,578,250 | Jones | Dec. 11, 1951 |
| 2,626,492 | Balsiger | Jan. 27, 1953 |
| 2,677,307 | Bloss | May 4, 1954 |